(12) United States Patent
Danielsson et al.

(10) Patent No.: US 11,030,365 B1
(45) Date of Patent: Jun. 8, 2021

(54) SYSTEMS AND METHODS FOR DETERMINING FINITE ELEMENTS IN PHYSICS SIMULATION SYSTEMS FOR MODELING PHYSICAL SYSTEMS USING COMMON GEOMETRY SHAPE FUNCTION SPACES

(71) Applicant: Comsol AB, Stockholm (SE)

(72) Inventors: Erik Danielsson, Vaellingby (SE); Lars Langemyr, Stockholm (SE); Nils Malm, Lidingö (SE); Arne Nordmark, Stocksund (SE); Hans Rullgård, Nynäshamn (SE); Elin Svensson, Älvsjö (SE); Henrik Sönnerlind, Ekerö (SE); Johan Thaning, Årsta (SE); Johan Öjemalm, Solna (SE)

(73) Assignee: COMSOL AB, Stockholm (SE)

( * ) Notice: Subject to any disclaimer, the term of this patent is extended or adjusted under 35 U.S.C. 154(b) by 697 days.

(21) Appl. No.: 15/591,290

(22) Filed: May 10, 2017

Related U.S. Application Data

(60) Provisional application No. 62/340,112, filed on May 23, 2016, provisional application No. 62/334,849, filed on May 11, 2016.

(51) Int. Cl.
  *G06F 30/23* (2020.01)
  *G06F 3/0482* (2013.01)
  *G06F 111/10* (2020.01)

(52) U.S. Cl.
  CPC ............ *G06F 30/23* (2020.01); *G06F 3/0482* (2013.01); *G06F 2111/10* (2020.01)

(58) Field of Classification Search
  CPC ............... G06F 17/5018; G06F 3/0482; G06F 2217/16; G06F 30/23; G06F 2111/10
  (Continued)

(56) References Cited

U.S. PATENT DOCUMENTS

| | | | | |
|---|---|---|---|---|
| 5,604,891 A | * | 2/1997 | Burnett | ............... G06F 17/5018 345/419 |
| 5,604,893 A | * | 2/1997 | Burnett | ................... G06F 30/23 703/2 |

(Continued)

OTHER PUBLICATIONS

Martin Claude Domfang, "Analysis of Laminated Anisotropic Plates and Shells Via a Modified Complementary Energy Principle Approach", 2013, 241 pages.*

(Continued)

*Primary Examiner* — Juan C Ochoa
(74) *Attorney, Agent, or Firm* — Nixon Peabody LLP

(57) ABSTRACT

Systems and methods for modeling physical systems include displaying geometric representation of a physical system on a physics simulation system. User-selection inputs received indicate, for mesh elements, selections of dependent variable shape function spaces representing dependent variables. Geometry shape function space options for simulating the physical system are determined that are common to mesh elements and include a serendipity shape function space of second order or higher. A determined geometry shape function space option is a subset of a combination of the dependent variable shape function spaces and satisfies accuracy criteria based on an accuracy ordering of shape function spaces. A finite element mesh for the physical system is created based on the mesh elements, a selected geometry shape function space, and the selection of dependent variable shape function spaces. A solution to a finite element simulation of the physical system being modeled is generated and the geometric representation displayed.

24 Claims, 19 Drawing Sheets

(58) Field of Classification Search
USPC .............................................................. 703/1
See application file for complete search history.

(56) References Cited

U.S. PATENT DOCUMENTS

| | | | |
|---|---|---|---|
| 5,966,524 A * | 10/1999 | Burnett ................... | G06F 30/23 |
| | | | 703/5 |
| 7,519,518 B2 | 4/2009 | Langemyr | |
| 7,596,474 B2 | 9/2009 | Langemyr | |
| 7,623,991 B1 | 11/2009 | Langemyr | |
| 8,457,932 B2 | 6/2013 | Langemyr | |
| 9,146,652 B1 * | 9/2015 | Danielsson ............. | G06F 3/048 |
| 2013/0197886 A1 * | 8/2013 | Langemyr ............... | G06F 17/12 |
| | | | 703/2 |
| 2014/0222384 A1 * | 8/2014 | Nordmark ........... | G06F 17/5018 |
| | | | 703/1 |
| 2016/0077810 A1 | 3/2016 | Bertilsson | |

OTHER PUBLICATIONS

O. Rübenkönig, Free surface flow and the IMTEK mathematica supplement, 2008, Doctoral dissertation, Verlag nicht ermittelbar, pp. 1-144.*
Bathe, "Finite Element Procedures", Prentice-Hall, Inc., 2006 (pp. 672-673), 4 pages.
Zienkiewicz et al., "The Finite Element Method", vol. 1, The Basis, Fifth Edition, Butterworth-Heinemann, Oxford, 2000 (pp. 164-199), 38 pages.
Bathe, "Finite Element Procedures", Prentice-Hall, Inc., 2006 (pp. 377-378), 4 pages.
Ehrlund et al., U.S. Appl. No. 15/282,469, entitled "Systems and Methods for Reducing Application Startup Times for Physics Modeling Applications", filed Sep. 30, 2016, 75 pages.

* cited by examiner

| | | |
|---|---|---|
| 0D | Vertex | . |
| 1D | Edge | — |
| 2D | Triangle | △ |
| | Quadrilateral | ▭ |
| 3D | Hexahedron |  |
| | Prism | 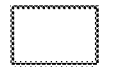 |
| | Pyramid | 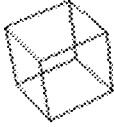 |
| | Tetrahedron |  |
FIG. 3

Lagrange shape function space monomials and tuple sets

First order quadrilateral

$\{x^0y^0, x^1y^0, x^0y^1, x^1y^1\}$ $\{(0,0), (1,0), (0,1), (1,1)\}$

Second order quadrilateral

$\{x^0y^0, x^1y^0, x^0y^1, x^2y^0, x^1y^1, x^0y^2, x^2y^1, x^1y^2, x^2y^2\}$ $\{(0,0), (1,0), (0,1), (2,0), (1,1), (0,2), (2,1), (1,2), (2,2)\}$

Third order quadrilateral

$\{x^0y^0, x^1y^0, x^0y^1, x^2y^0, x^1y^1, x^0y^2, x^3y^0, x^2y^1, x^1y^2, x^0y^3, x^3y^1, x^2y^2, x^1y^3, x^3y^2, x^2y^3, x^3y^3\}$ $\{(0,0), (1,0), (0,1), (2,0), (1,1), (0,2), (3,0), (2,1), (1,2), (0,3), (3,1), (2,2), (1,3), (3,2), (2,3), (3,3)\}$

Serendipity shape function space monomials and tuple sets

First order quadrilateral

$\{x^0y^0, x^1y^0, x^0y^1, x^1y^1\}$ $\{(0,0), (1,0), (0,1), (1,1)\}$

Second order quadrilateral

$\{x^0y^0, x^1y^0, x^0y^1, x^2y^0, x^1y^1, x^0y^2, x^2y^1, x^1y^2\}$ $\{(0,0), (1,0), (0,1), (2,0), (1,1), (0,2), (2,1), (1,2)\}$

Third order quadrilateral

| Element (Shorthand) | Monomial Containment |
|---|---|
| Linear Serendipity (S1) | L1, S1 |
| Linear Lagrange (L1) | L1, S1 |
| Quadratic Serendipity (S2) | S2, L1, S1 |
| Quadratic Lagrange (L2) | L2, S2, L1, S1 |
| Cubic Serendipity (S3) | S3, S2, L1, S1 |
| Cubic Lagrange (L3) | L3, S3, L2, S2, L1, S1 |
| Quartic Serendipity (S4) | S4, S3, L2, S2, L1, S1 |
| Quartic Lagrange (L4) | L4, S4, L3, S3, L2, S2, L1, S1 |
| Quintic Lagrange (L5) | L5, L4, S4, L3, S3, L2, S2, L1, S1 |

FIG. 5

| Curl Shape Function Order | Maximum Geometry Shape Function Order |
|---|---|
| 1 | 1 |
| 2 | 1 |
| 3 | 2 |
| 4 | 2 |

| Divergence Shape Function Order | Maximum Geometry Shape Function Order |
|---|---|
| 1 | 1 |
| 2 | 1 |
| 3 | 1 |
| 4 | 2 |

1101

| M1 | M2 |
|---|---|
| U1,U2,U3 | U1,U4 |

1102

| Dependent Variable | Shape Function space type and order | Accept Super Parametric Finite elements | Second set shape function indices |
|---|---|---|---|
| U1 | Linear Lagrange (L1) | Yes | L1, S1 |
| U2 | Cubic Serendipity (S3) | No | S3, S2, L1, S1 |
| U3 | Quadratic Lagrange (L2) | No | L2, S2, L1, S1 |
| U4 | Cubic Lagrange (L3) | Yes | L3, S3, L2, S2, L1, S1 |

1103

| Mesh Group | Third Set Indices |
|---|---|
| M1 | S2, L1, S1 |
| M2 | L3, S3, L2, S2, L1, S1 |

| Mesh Group | Third Set Indices |
|---|---|
| M1 | S2, L1, S1 |
| M2 | L3, S3, L2, S2, L1, S1 |

1202

| Geometry Shape Function Spaces listed in accuracy order, lower to higher | First set of shape function indices |
|---|---|
| Linear Serendipity (S1) | L1, S1 |
| Linear Lagrange (L1) | L1, S1 |
| Quadratic Serendipity (S2) | S2, L1, S1 |
| Quadratic Lagrange (L2) | L2, S2, L1, S1 |
| Cubic Serendipity (S3) | S3, S2, L1, S1 |
| Cubic Lagrange (L3) | L3, S3, L2, S2, L1, S1 |
| Quartic Serendipity (S4) | S4, S3, L2, S2, L1, S1 |
| Quartic Lagrange (L4) | L4, S4, L3, S3, L2, S2, L1, S1 |
| Quintic Lagrange (L5) | L5, L4, S4, L3, S3, L2, S2, L1, S1 |

SYSTEMS AND METHODS FOR DETERMINING FINITE ELEMENTS IN PHYSICS SIMULATION SYSTEMS FOR MODELING PHYSICAL SYSTEMS USING COMMON GEOMETRY SHAPE FUNCTION SPACES

CROSS-REFERENCE TO RELATED APPLICATIONS

This application claims priority to and the benefits of U.S. Provisional Application No. 62/340,112, filed May 23, 2016, and U.S. Provisional Application No. 62/334,849, filed May 11, 2016, the disclosures of which are each hereby incorporated by reference herein in their entireties.

FIELD OF THE INVENTION

The present invention relates generally to simulation systems and methods, and more particularly, to systems and methods for determining finite elements in physics simulation systems for modeling physical systems using common geometry shape function spaces.

BACKGROUND

Computing systems are useful tools. Modeling and simulation computing systems have applications in research and product development, and include instructions implemented for different types of analyses that are stored on computer readable media (e.g., temporary or fixed memory, magnetic storage, optical storage, electronic storage, flash memory, other storage media). The instructions, when executed by the modeling or simulation computing system processor, perform one or more tasks. A computing system executes machine instructions in connection with translation of source code to machine executable code, to perform the modeling, simulation, and/or problem solving tasks.

One technique, which may be used to model and simulate physical phenomena or physical processes, is to represent various physical properties and quantities, of the physical phenomena or physical processes being modeled and simulated, in terms of variables and equations or in other quantifiable forms that may be processed by a simulation computing system. In turn, these equations or other quantifiable forms may be solved for one or more variables associated with the equation, or the simulation system may be configured to solve a problem using other received input parameters. It would be desirable to have improved modeling and simulation systems that simplify the selection of shape function spaces yet maintain or increase the accuracy in a resulting solution to a finite element simulation of a physical system being modeled by the system.

SUMMARY OF THE INVENTION

According to one aspect of the present disclosure, a method is implemented on a physics simulation system for modeling physical systems. The physics simulation system includes one or more simulation system processors, one or more electronic input devices, one or more electronic display devices, and one or more physical memory devices. The method comprises: (i) displaying on at least one of the one or more electronic display devices a geometric representation of a physical system being modeled on the physics simulation system, the geometric representation being discretized into a plurality of mesh elements representing at least in part a discretized geometric representation of the geometry of the physical system; (ii) receiving, via at least one of the one or more electronic input devices, one or more user-selection inputs for the plurality of mesh elements, the user-selection inputs indicating selections of dependent variable shape function spaces representing at least two dependent variables; (iii) determining, via at least one of the one or more simulation system processors, one or more geometry shape function space options to select from for simulating the physical system, the determined geometry shape function space options being common to the plurality of mesh elements and including a serendipity shape function space of a second order or higher, the determining of the one or more geometry shape function space options including a determined geometry shape function space option being a subset of a combination of the at least two dependent variable shape function spaces and satisfying an accuracy criteria based on an accuracy ordering of shape function spaces; (iv) selecting a geometry shape function space from the determined geometry shape function space options; (v) creating, via at least one of the one or more simulation system processors, a finite element mesh for the physical system being modeled, wherein the finite element mesh is based on the plurality of mesh elements, the selected geometry shape function space(s), and the selection of dependent variable shape function spaces; (vi) generating, via at least one of the simulation system processors, a solution to a finite element simulation of the physical system being modeled, the solution based on the created finite element mesh; and (vii) displaying, on one of the one or more electronic display devices, a geometric representation of the generated solution to the simulation of the physical system being modeled.

According to another aspect of the present disclosure, a physics simulation system for modeling physical systems is configured to generate a finite element simulation of a physical system being modeled. The physics simulation system comprises one or more electronic input devices; one or more physical memory devices; and one or more simulation system processors. The one or more simulation system processors are configured to: (i) receive a geometric representation of a physical system being modeled on the physics simulation system, the geometric representation being discretized into a plurality of mesh elements representing at least in part a discretized geometric representation of the geometry of the physical system, (ii) receive input data representing one or more user-selection inputs for the plurality of mesh elements, the user-selection inputs indicating selections of dependent variable shape function spaces representing at least two dependent variables, (iii) determine one or more geometry shape function space options to select from for simulating the physical system, the determined geometry shape function space options being common to the plurality of mesh elements and including a serendipity shape function space of a second order or higher, the determining of the one or more geometry shape function space options including a determined geometry shape function space option being a subset of a combination of the at least two dependent variable shape function spaces and satisfying an accuracy criteria based on an accuracy ordering of shape function spaces; (iv) select a geometry shape function space from the determined geometry shape function space options, (v) create a finite element mesh for the physical system being modeled, wherein the finite element mesh is based on the plurality of mesh elements, the selected geometry shape function space(s), and the selection of dependent variable shape function spaces, (vi) generate a solution to a finite element simulation of the physical system being modeled, the solution based on the created finite element mesh, and (vii) transmit output data for display of a geometric representation of the generated solution to the simulation of the physical system being modeled.

According to another aspect of the present disclosure, a physics simulation system for modeling physical systems is configured to generate a finite element simulation of a physical system that is being modeled. The physics simulation system comprises one or more electronic input devices; one or more physical memory devices; one or more electronic display devices; and one or more simulation system processors. The one or more simulation system processors are configured to: (i) display on at least one of the one or more electronic display devices a geometric representation of a physical system being modeled on the physics simulation system, the geometric representation being discretized into a plurality of mesh elements representing at least in part a discretized geometric representation of the geometry of the physical system, (ii) receive, via at least one of the one or more electronic input devices, one or more user-selection inputs for the plurality of mesh elements, the user-selection inputs indicating selections of dependent variable shape function spaces representing at least two dependent variables, (iii) determine, via at least one of the one or more simulation system processors, one or more geometry shape function space options to select from for simulating the physical system, the determined geometry shape function space options being common to the plurality of mesh elements and including a serendipity shape function space of a second order or higher, the determining of the one or more geometry shape function space options including a determined geometry shape function space option being a subset of a combination of the at least two dependent variable shape function spaces and satisfying an accuracy criteria based on an accuracy ordering of shape function spaces, (iv) select a geometry shape function space from the determined geometry shape function space options, (v) create, via at least one of the one or more simulation system processors, a finite element mesh for the physical system being modeled, wherein the finite element mesh is based on the plurality of mesh elements, the selected geometry shape function space(s), and the selection of dependent variable shape function spaces, (vi) generate, via at least one of the simulation system processors, a solution to a finite element simulation of the physical system being modeled, the solution based on the created finite element mesh, and (vii) display, on one of the one or more electronic display devices, a geometric representation of the generated solution to the simulation of the physical system being modeled.

Additional aspects of the invention will be apparent to those of ordinary skill in the art in view of the detailed description of various embodiments, which is made with reference to the drawings, a brief description of which is provided below.

BRIEF DESCRIPTION OF THE DRAWINGS

Features and advantages of the present disclosure will become more apparent from the following detailed description of exemplary embodiments thereof taken in conjunction with the accompanying drawings in which:

FIG. 3 illustrates exemplary aspects of mesh elements sorted according to dimensionality and illustrating exemplary mesh element(s) of various geometry types, according to aspects of the present disclosure.

FIG. 4 illustrates exemplary sets of shape function monomials and corresponding sets of tuples, the tuples being one type of indices used for representing associated shape function spaces, according to aspects of the present disclosure.

FIG. 5 illustrates exemplary aspects of indices for representing associated shape function spaces with the indices illustrated in the right column representing shape function spaces which are subsets of shape function spaces in the left column, according to aspects of the present disclosure.

FIG. 11 provides illustrative non-limiting examples for constructing third sets of shape function indices, according to aspects of the present disclosure.

FIG. 12 provides illustrative non-limiting examples for comparing third sets of shape function indices to first sets of geometry shape function indices, according to aspects of the present disclosure.

Figure 1A:
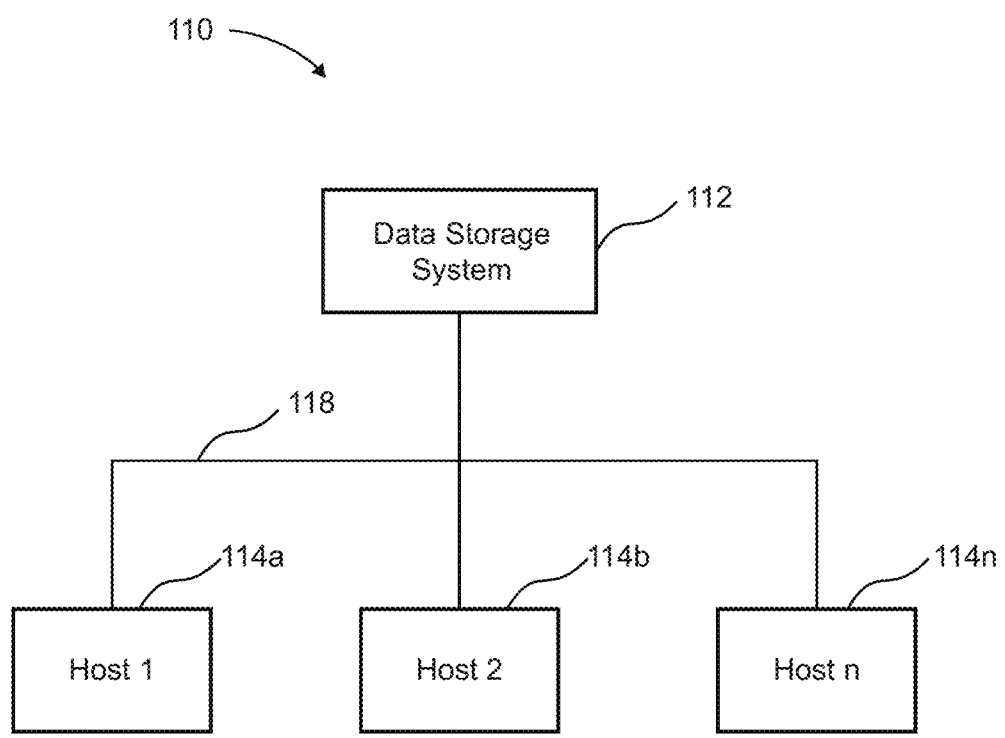
FIG. 1A-1C illustrate exemplary aspects of physics simulation computing systems for determining finite elements using a common geometry shape function space according to aspects of the present disclosure.

While the present disclosure is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred aspects of the invention with the understanding that the present disclosure is to be considered as an exemplification of the principles of the invention and is not intended to limit the broad aspect of the invention to the aspects illustrated. For purposes of the present detailed description, the singular includes the plural and vice versa (unless specifically disclaimed); the word "or" shall be both conjunctive and disjunctive; the word "all" means "any and all"; the word "any" means "any and all"; and the word "including" means "including without limitation."

The present disclosure describes desirable improvements to systems and methods for determining finite elements in physics simulation systems for modeling physical systems. The disclosure describes, for example, improvements to the functionality of physics modeling and/or simulation computing systems that determine finite elements through the application of common geometry shape function space(s). Contemplated systems for implementing the features described by the present disclosure include those described in FIGS. 1A-1C and 2 or systems operable for displaying the outputs included in the graphical user interfaces, such as those illustrated in FIGS. 13-18.

Methods and systems are described that include exemplary aspects for selecting common geometry shape function space(s) for finite elements in physics (including multiphysics) modeling or simulation systems. In certain aspects, finite elements in multiphysics modeling and simulation systems may include multiphysics couplings, as described, for example, in U.S. Pat. Nos. 7,623,991; 7,519,518; 7,596,474; and 8,457,932, the disclosures of which are hereby incorporated by reference herein their entireties, and which are also assigned to the applicant, COMSOL AB of Stockholm, Sweden. A multiphysics simulation may be constructed using one or more physics interfaces or one or more multiphysics interfaces where the physics or multiphysics interfaces define dependent variable(s) on a geometry representing a physical system.

Exemplary aspects of physics modeling or simulation computing systems are now described where the modeling or simulation operations for determining finite elements can be improved using a common geometry shape function space. The contemplated computing systems may be operable for executing one or more computer programs, including engineering analysis systems and methods, stored on computer readable media (e.g., temporary or fixed memory, magnetic storage, optical storage, electronic storage, flash memory, other storage media).

It is contemplated that modeling or simulation systems can include networked computers, processors, or processing units. In certain embodiments, modeling or simulation system processing units may be operating directly on a physics simulation system user's computer (e.g., a host or client), and in other embodiments, a physics simulation system processing unit may be operating remotely (e.g., a remote server system). For example, a user may provide various input parameters at one modeling or simulation computer or terminal located at a certain location. Those parameters may be processed locally on the computer or the parameters may be transferred over a local area network or a wide area network, to another simulation processing unit, located elsewhere on the network that is configured to process the input parameters. The second processing unit may be associated with a server connected to the Internet (or other network) or the second processing unit can be several processing units connected to the Internet (or other network), each handling select function(s) for developing and solving a problem on the simulation system. It is further contemplated that the results of the processing by the one or more processing units can then be assembled at yet another server or processing unit. It is also contemplated that the results may be assembled back at the terminal or computer where the user is situated. The simulation terminal or computer where the user is situated can then display the solution of the modeling or simulation system to the user via a display (e.g., a transient display) or in hard copy form (e.g., via a printer). Alternatively or in addition, the solution may be stored in a memory associated with the terminal or computer, or the solution may be stored on another server that the user may access to obtain the solution from the modeling and/or simulation system. Additional non-limiting aspects of physics simulation systems contemplated for modeling physical systems are described below in the context of exemplary FIGS. 1A-1C and FIG. 2.

Figure 1B:
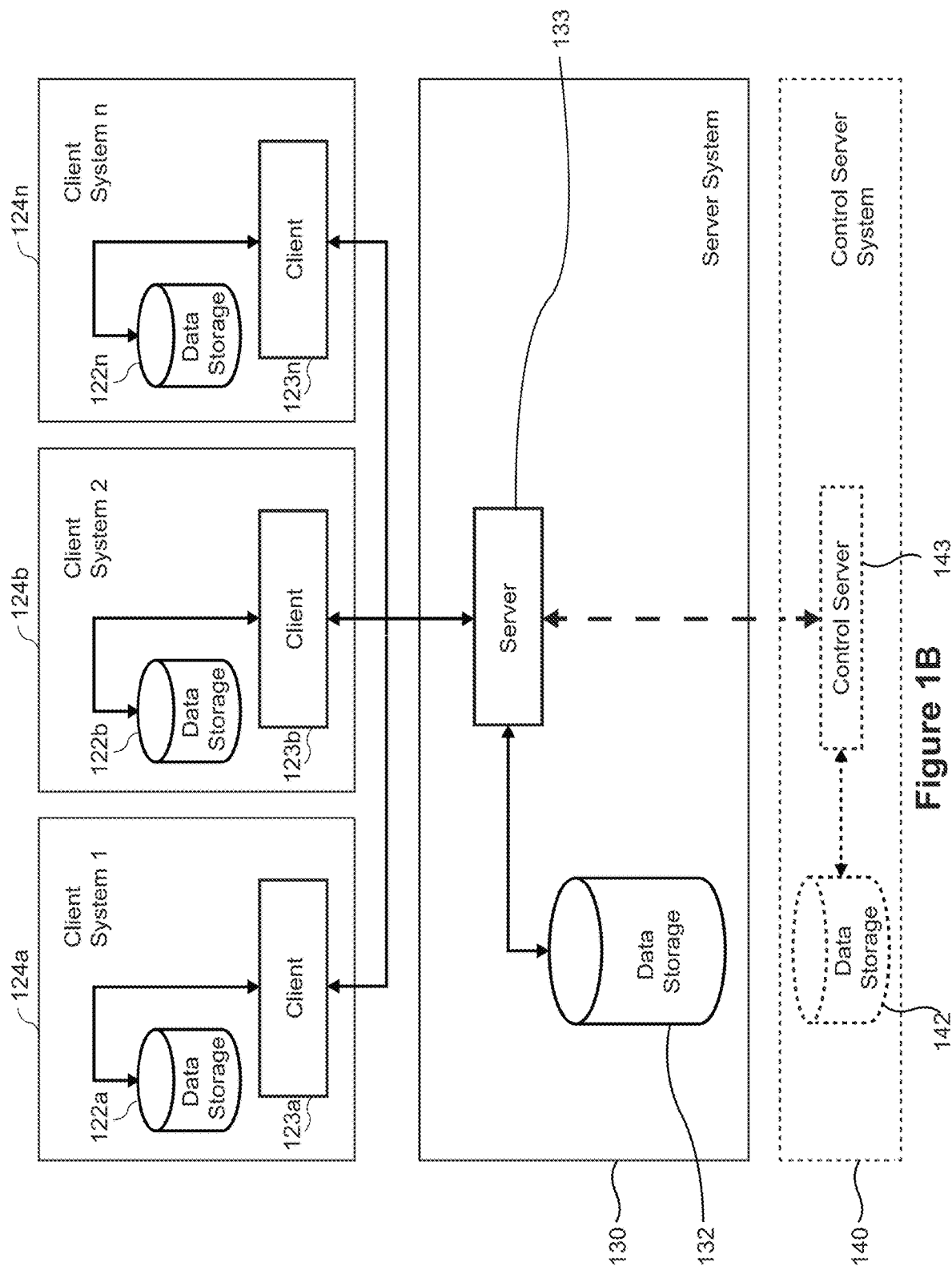
Figure 1C:
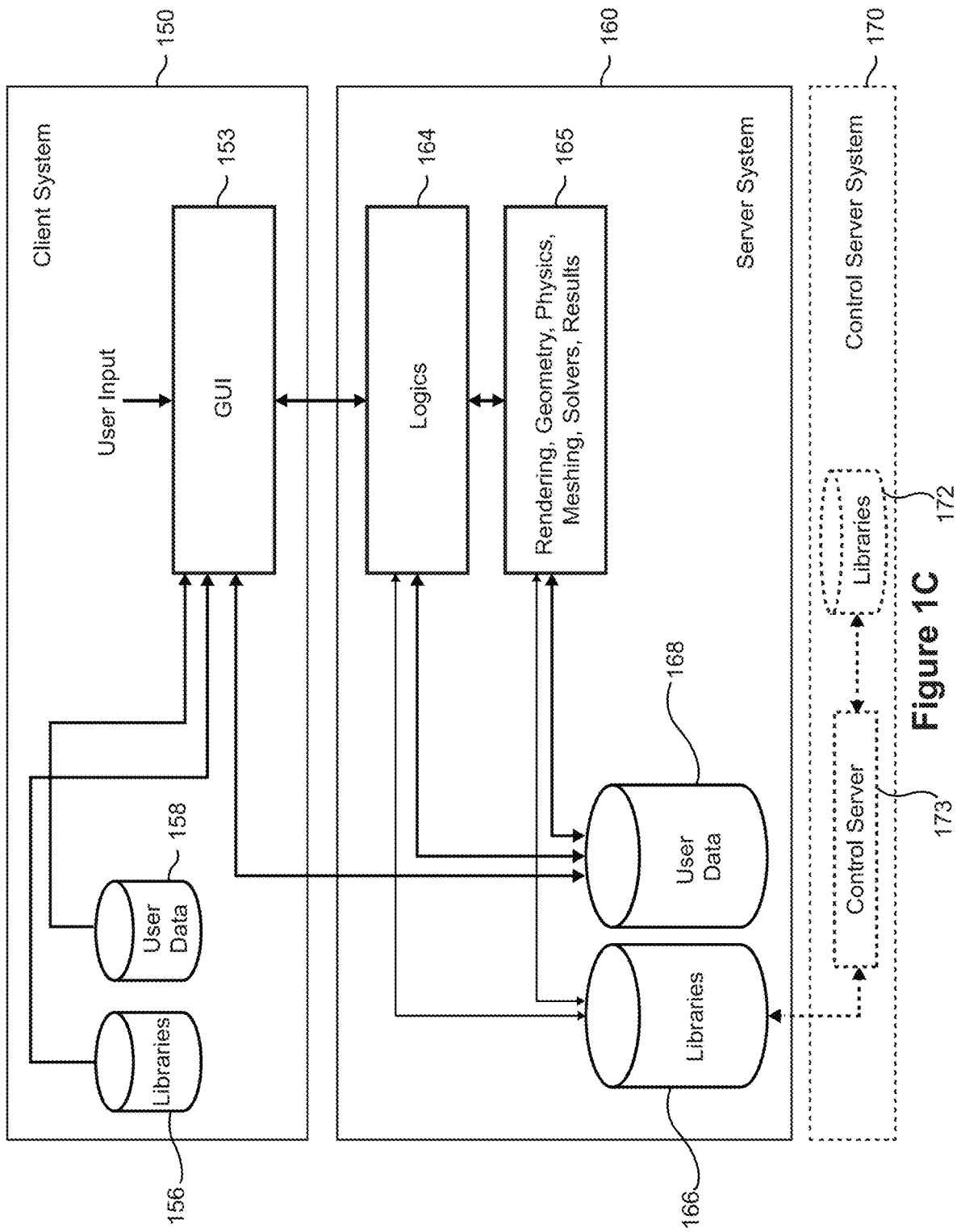

Referring now to FIGS. 1A-1C, exemplary aspects of physics simulation computing systems are illustrated that may be used with the exemplary methods described herein.

FIG. 1A illustrates configurations for a simulation computing system 110 that includes a data storage system 112 connected to host systems 114a-114n through communication medium 118. In some aspects, data storage systems may also be hosted locally on any one of the host systems 114a-114n. In system 110, the "n" hosts 114a-114n may access the data storage system 112, for example, in performing input/output (I/O) operations. The communication medium 118 for communicatively connecting the various system components may be any one of a variety of networks or other type of communication connections as known in the field of computer simulation and modeling of physical systems. For example, the communication medium 118 may be the Internet, an intranet, or other network connection by which the host systems 114a-114n may access and communicate with the data storage system 112, and may also communicate with others included in the system 110, including without limitation systems based on various forms of network communications (e.g., fiber optic, wireless, Ethernet).

Each of the host systems 114a-114n and the data storage system 112 included in the simulation computing system 110 may be connected to the communication medium 118 by any one of a variety of connections as may be provided and supported in accordance with the type of communication medium 118. Processing units may be included in the host computer systems 114a-114n or a data manager system may be any one of a variety of commercially available single or multi-processor system, such as an Intel-based processor, server, or other type of commercially available processor able to support incoming traffic in accordance with each particular embodiment and application.

It should be noted that the particulars of the hardware and systems included in each of the host systems 114a-114n, as well as those components that may be included in the data storage system 112 are described herein in more detail, and may vary with each particular embodiment. For example, each of the host computers 114a-114n, as well as the data storage system 112, may all be located at the same physical site, or, alternatively, may also be located in different physical locations. Examples of the communication medium that may be used to provide the different types of connections between the host computer systems, the data manager system, and the data storage system of the modeling and/or simulation computing system 110 may use a variety of different communication protocols such as SCSI, ESCON, Fiber Channel, or functional equivalents that are known to those skilled in the field of computer simulation and modeling of physical systems. Some or all of the connections by which the hosts and data storage system 112 may be connected to the communication medium 118 may pass through other communication devices, such as a Connectrix or other switching equipment that may exist, both physical and virtual, such as a phone line, a repeater, a multiplexer, a satellite, or systems that perform similar or equivalent communications operations.

Each of the host computer systems may perform different types of data operations, such as storing and retrieving data files used in connection with an application executing on one or more of the host systems. For example, a computer program may be executing on the host computer 114a and store and retrieve data from the data storage system 112. The data storage system 112 may include any number of a variety of different data storage devices, such as disks, tapes, solid-state memory, and the like in accordance with each implementation. As will be described in following paragraphs, methods may reside and be executing on any one of the host computer systems 114a-114n. Data may be stored locally on the host system executing the methods, as well as remotely in the data storage system 112 or on another host computer system. Similarly, depending on the configuration of each modeling and/or simulation computing system 110, methods as described herein may be stored and executed on one of the host computer systems and accessed remotely by a user on another computer system using local data. A variety of different system configurations and variations are possible then as will be described in connection with the embodiment of the system 110 of FIG. 1A and should not be construed as a limitation of the techniques described elsewhere herein.

Turning now to FIG. 1B, additional illustrative non-limiting exemplary aspects of physics simulation computing systems are described for modeling physical systems. Systems can include one or more client processing systems 124a, 124b . . . 124n. In some aspects, the client processing systems 124a-n include components corresponding to a simulation system for modeling physical systems, such as components (when executed on a processor present in client computer(s) 123a, 123b . . . 123n) to display a graphical user interface, receive user input, and display outputs of the simulation system that are results of the user input. The client processing system(s) 124a-n can further include software components that generate input commands, send user input data, and send generated input commands to a simulation server system 130 communicatively connected to the client processing system(s). The server system 130 includes a server processing unit 133. The client processing system(s) 124a-n can also receive output data and output commands from the server system where the output data and output commands correspond to the user input previously sent to the server system 130. The client processing system(s) 124a-n and the server system 130 can each include their own data storage components 122a, 122b . . . 122n, 132. It is further contemplated that client processing system(s) can further include components, that upon execution, implement output commands and display output data in a graphical user interface.

It is contemplated that a server system 130 can include components, that upon execution, receive input data and input commands from communicatively connected client processing system(s) 124a, 124b . . . 124n. In some aspects, the server system 130 can further include executable components for sending input data to and receiving data from a control server computer 140 that includes a control server processor 143 and may also have data storage components 142. The control server computer can be used to control access to certain operations of a simulation system for modeling physical systems. The server system 130 can also include executable components for generating output data and output commands based on the received input data, input commands, and/or control data; and send these output data and output commands to any one of the client processing system(s) 124a-n. In some aspects, the server system 130 may further include executable components to verify if an input command may be executed, as determined by the received control data.

Simulation processing units, display devices, and/or memory devices are contemplated to be a part of the client processing systems 124a-n, server system(s) 130, and/or control server system(s) 140.

Turning now to FIG. 1C, further non-limiting exemplary aspects of physics simulation computing systems are described. The system can include a client processing system 150 that includes executable components for a graphical user interface 153, where user input may be received and output may be displayed. The client processing system can store user data generated through user input and output received from a server system 160. The client processing system may also locally store executable software component libraries which are used to display graphical user interface(s), receive input, generate input commands, execute output commands, and display output. User data can be stored on client user data storage component 158 or on a server system user data storage component 168. Similarly library data can be stored locally on a client library storage component 156.

In one illustrative aspect, user input may be received via the GUI 153 of the client processing system 150 based on a user selecting an option via the GUI 153 to create an exemplary geometry, such as a cylinder geometry. The input and input commands may be sent to the communicatively connected server system 160. Output data and output commands received from the server system can then be executed on the client processing system 150 to render and display the exemplary cylinder geometry and to refresh the graphical user interface 153, based on the exemplary user input for a cylinder. Thus, the server system 160 can receive user input data and input commands from a client processing system 150 and use the received data and commands to generate output data and output commands that can be received by the client processing system 150. These output data and output commands determine what will be shown in the graphical user interface 153 in the client processing system 150 and are based on the user input.

The server system can include executable components that determine logics associated with a simulation system for modeling physical systems. For example, upon execution of logics component 164, which is similar to an application program interface component, the logics component 164 can receive input data and input commands from the client processing system 150 and determine how to process received input. The logics component 164 can determine which simulation software components for modeling physical systems should be used to process input data and execute input commands, and which components should be used to generate output data and output commands, based on the user input. The input data and input commands may be relayed by the logics component(s) 164, upon execution, to one or more of rendering, geometry, physics, meshing, assembling, solver, and results components, collectively referred to in FIG. 1C as component 165. The output data and the output commands from component 165 can then be relayed to the client processing system 150 by the logics components 164.

The server system 160 may store and access logics component libraries 166. The server system 160 may also store user data 168 used by the logics components 164. As discuss above, the server system 160 may also include aspects for rendering the graphical user interface in component 165, that builds the geometry, defines the physics, generates the mesh, assembles the numerical model, solves the numerical model, and generates the output data and output commands. Continuing on the illustrative example of the cylinder, a logics component 164 can receive user input in the form of input data and input commands for generating a cylinder and send these data and commands to a geometry component that is part of component 165. The geometry component executes the cylinder command and sends an output to the rendering component that is also a part of component 165. The logics component 164 may then receive the output from the rendering component and send rendering data, for the cylinder geometry together with its settings, to the client processing system 150 for display in the graphical user interface 153.

The server system 160 may also store and access library components 166 for rendering, building the geometry, generating the mesh, assembling the numerical model, solving the numerical model equations, and generating the results.

In some aspects, the graphical user interface 153 and the logics components 164 may send data and commands that may trigger a control check in the rendering, geometry, physics, meshing, assembling, solvers, and results components of component 165, which then may generate a request that is sent to a control server 170. The server system 160 may then receive data from control server system 170 that is used to determine if it should allow the execution of commands. The data sent to the server system 160 from the control server system 170 is generated by the control server 173 using a file that may be stored, for example in the libraries component 172, of the control server system 170.

Simulation processing units, display devices, and/or memory devices are contemplated to be a part of the client processing system 150, server system 160, and/or control server system 170.

Figure 2:
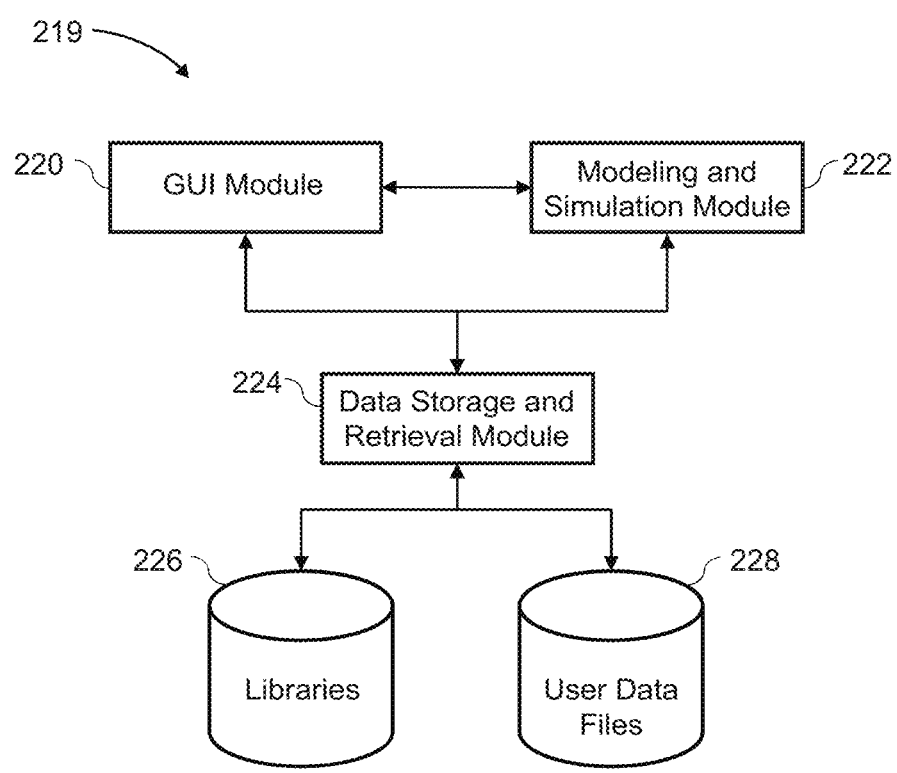
FIG. 2 illustrates an exemplary aspect of a standalone physics simulation computing system or one that may reside and be executed in one of the hosts of FIG. 1A according to aspects of the present disclosure.

Referring now to FIG. 2, an exemplary aspect of a simulation computing system 219 for modeling physical systems is illustrated that may reside, for example, on a single computer or in one of a plurality of host computer systems (such as host computers 114a-114n illustrated in FIG. 1A). The simulation computing system may be divided into several components. One exemplary aspect of the system may include a GUI module 220, a Modeling and Simulation module 222, and a Data Storage and Retrieval module 224. The GUI module 220 can provide for interactions with system users. The Modeling and Simulation module 222 can provide for managing and performing physics (including multiphysics) simulations. The Data Storage and Retrieval module 224 can provide for loading and saving the model in a file, and to load and store other types of files which may be used during the simulation or may be used as input or output to the simulation.

The GUI module 220 may communicate with the Modeling and Simulation module 222 by sending and receiving commands. As may also occur on the other modeling and/or simulation computing systems described herein, the act of sending and receiving commands may be performed through an application programming interface ("API") or other similar components. In one aspect of the system, the API may be object oriented, and mix data and function calls within the same structure. In another aspect of the system, the API may use a data structure that is separate from function calls.

It is contemplated that the GUI module 220 can include a plurality of modeling or simulation systems or subsystems. For example, the determination of finite elements using common geometry shape function spaces may operate in the GUI module and/or in other modules (interfacing or otherwise) such as the Modeling and Simulation Module 222 and/or the Data Storage and Retrieval Module 224.

It is contemplated that in certain aspects of the present disclosure components of a simulation system may reside on different host computing systems. For example, the GUI module 220 may reside on a personal computer host and the Modeling and Simulation module 222 may reside on a server computer host. It is further contemplated that the Data Storage and Retrieval module 224 may reside on either the personal computer host or the server computer host, or yet another separate computer host. If the computer hosts are not identical, the API can be configured to use a computer network to communicate between hosts. In one embodiment, an object-oriented API may be configured to send data and method calls over the computer network or in another embodiment send data and function calls between the components over a computer network. The API may also be able to handle a Data Storage and Retrieval module 224 which may be located either on the host of the GUI module 220 or the Modeling and Simulation module 222, or on a separate host. In each of those cases, the Data Storage and Retrieval module 224 may be configured to load and store files on each of those hosts.

It is contemplated that in certain aspects, the system 219 may include, or be configured with, operating systems such as Windows 10, Mac OS®, iOS, Android®, Chrome® OS, and the like, or system components other than what is described and represented in the modeling and/or simulation computing system 219 illustrated in FIG. 2. In the exemplary aspect illustrated in FIG. 2, Libraries 226 and the User Data Files 228 can be stored locally within the host computing system. It is further contemplated that in certain aspects, the Libraries 226 and/or User Data Files 228, as well as copies of these, may be stored in another host computer system and/or in the Data Storage System 112 of the computing system 110. However, for simplicity and explanation in paragraphs that follow, it may be assumed in a non-limiting manner that the system 219 may reside on a single host computing system such as 114*a* with additional backups, for example, of the User Data Files and Libraries, in the Data Storage System 112.

In certain aspects of the present disclosure, portions of the simulation computing system 219, such as the GUI module 220, the Modeling and Simulation module 222, the Data Storage and Retrieval module 224, and/or the Libraries 226 may be included or executed in combination with other available system package(s). These components may operate on one of the host systems 114*a*-114*n*, and may include one or more operating systems, such as, Windows 10, Windows HPC Server, Unix®, Linux®, Mac OS®, iOS, Chrome® OS, Android®, and the like. It is further contemplated that the modules of the modeling system 219 may be written in any one of a variety of computer programming languages, such as, C, C++, C #, Java®, or any combination(s) thereof, or other programming languages.

It is contemplated that the GUI module 220 may display GUI windows in connection with obtaining data for use in performing modeling, simulation, and/or other problem solving for one or more processes and/or physics phenomena under consideration by a system user. The one or more processes and/or phenomena may be assembled and solved by the Modeling and Simulation module 222. That is, user data may be gathered or received by the system using modules, such as the GUI module 220, and subsequently used by the Modeling and Simulation module 222. Thereafter, the data may be transferred or forwarded to the Data Storage and Retrieval module 224 where the user-entered data may be stored in a separate data structure (e.g., User Data Files 228). It is contemplated that other data and information may also be stored and retrieved from a separate data structure, such as Libraries 226, which may be used by the Modeling and Simulation module 222 or in connection with the GUI module 220.

The various data files that may be associated with a simulation system, such as User Data Files 228 and the Libraries 226, may be stored in any one of a variety of data file formats in connection with a file system used in the host computing system or in the Data Storage System 112. In certain aspects, the system 219 may use any one of a variety of database packages in connection with the storage and retrieval of data. The User Data files 228 may also be used in connection with other simulation and modeling systems. For example, the User Data files 228 may be stored in a format that may also be used directly or indirectly as an input to any one of a variety of other modeling or simulation systems. In certain aspects, data may be imported and/or exported between different modeling systems. The format of the data may be varied or customized in accordance with each of the system(s) as well as in accordance with additional operations that each of the system(s) may include.

It is contemplated that the systems and methods described herein may be used for combining a plurality of physics interfaces to create a multiphysics model for modeling different physical phenomena or processes. Properties of the physics interfaces can be represented by partial differential equations (PDEs) that may be automatically combined to form PDEs describing physical quantities in a coupled system or representation. It is contemplated that the PDEs may be provided to the solver either independently as one PDE or a system of PDEs, describing a single phenomenon or process, or as one or several systems of PDEs describing several phenomena or processes.

It is contemplated that in certain aspects of the present disclosure physical properties can be used to model physical quantities for component(s) and/or process(es) being examined using the simulation system, and the physical properties can be defined using a GUI that allow the physical properties to be described as numerical values. In certain aspects, physical properties can also be defined as mathematical expressions that include one or more numerical values, space coordinates, time coordinates, and/or the actual physical quantities. In certain aspects, the physical properties may apply to some parts of a geometrical domain, and the physical quantity itself may be undefined in the other parts of the geometrical domain. A geometrical domain or "domain" may be partitioned into disjoint subdomains. The mathematical union of these subdomains forms the geometrical domain or "domain". The complete boundary of a domain may also be divided into sections referred to as "boundaries". Adjacent subdomains may have common boundaries referred to as "borders". The complete boundary is the mathematical union of all the boundaries including, for example, subdomain borders. For example, in certain aspects, a geometrical domain may be one-dimensional, two-dimensional, or three-dimensional in a GUI. However, as described in more detail elsewhere herein, the solvers may be able to handle any space dimension. It is contemplated that through the use of GUIs in one implementation, physical properties on a boundary of a domain may be specified and used to derive the boundary conditions of the PDEs.

Additional features of a simulation system for modeling physical systems, such as features that may be found in the Modeling and Simulation module 222, may provide for automatically deriving a system of PDE's and boundary conditions for a physics (including multiphysics) model. This technique can include merging the PDEs of the plurality of phenomena or processes, and may produce a single system of coupled PDEs, also using coupling variables or operators to couple processes in different coordinate systems, and may perform symbolic differentiation of the system of PDEs with respect to all the dependent variables for later use by the solver.

It is contemplated that certain aspects of the present disclosure may include features improving operations of a simulation computing system for modeling one or more of a plurality of engineering and scientific disciplines (e.g., acoustics, chemical reactions, diffusion, electromagnetism, fluid mechanics, geophysics, heat transfer, optics, plasma physics, quantum mechanics, semiconductor physics, structural mechanics, wave propagation, and the like). Certain aspects of a simulation system may involve more than one of the foregoing disciplines and can also include representing or modeling a combination of the foregoing disciplines. Furthermore, the techniques that are described herein may be used in connection with one or more systems of PDEs.

Turning now to FIG. 3, in some aspects a model geometry of a physical system is discretized into one or more mesh elements. Such mesh elements may be of different types, where the types are categorized according to the geometry of the mesh elements. These types for the mesh elements may be referred to herein as geometry type(s) of the mesh element. FIG. 3 includes an exemplary non-comprehensive list of some geometry types of mesh elements divided according to dimensionality (e.g., 2D) and showing an exemplary corresponding mesh element (e.g., triangle, quadrilateral).

In some aspects, each dependent variable may be discretized using finite elements. A finite element may comprise two shape function spaces including: (i) a geometry shape function space representing the shape of the finite element; and (ii) a dependent variable shape function space representing the values of a dependent variable.

A geometry shape function space common for finite elements representing the same mesh element of the physical system in a physics (including multiphysics) simulation can allow for consistent geometry representation(s) for all physics, in particular in cases with several frames, when implementing, for example, an Arbitrary Lagrangian-Eulerian (ALE) method as described, for instance, by Bathe, Klaus-Jurgen, *Finite Element Procedures*, pp. 672-673, Prentice-Hall, Inc., Upper Saddle River, N.J., USA, Klaus-Jürgen Bathe, 2006 (ISBN-13: 9780979004902).

For certain modeling aspects, it would be understood that a common geometry shape function space does not necessarily mean that the geometry shape function space should be the same on all mesh elements within a geometry. It would further be understood for certain modeling aspects that the geometry shape function space may be the same on all finite elements defined on the same mesh group.

In addition to categorizing finite element types according to geometry type, finite element types can be further subcategorized according to shape function type. For example, finite elements may be categorized into Lagrangian function type elements, Serendipity function type elements, and/or Hierarchical function type elements. A description of such function type elements is provided by: Zienkiewicz, O. C. and Taylor, R. L. *The Finite Element Method*, Volume 1, The Basis, Fifth Edition, pp. 164-199, Butterworth-Heinemann, Oxford, 2000 (ISBN-10: 0750650494).

Subdivision(s) into different types of finite element(s) are referred to as function type(s). For example, a multiphysics finite element model may use one or more function types of elements, such as Lagrangian type elements, Serendipity type elements, or Hierarchical type elements. It is also contemplated that finite elements can be hybrid type elements using, for example, serendipity geometry shape function spaces to represent geometry, and Lagrangian shape function spaces (or vice versa, or using other combinations of function types) to represent dependent variables. Such hybrid shape function spaces are contemplated using the methods described herein.

Geometry shape function spaces and dependent variable shape function spaces may be defined for each type of mesh elements. The purpose of such shape functions is to interpolate values between finite element nodes. For instance, specific to geometry, if a Computer Aided Design (CAD) geometry is discretized into mesh elements, various orders and types of geometry shape functions may be used to interpolate between nodes in the mesh. The discretized representation of the CAD geometry may represent the original CAD geometry to various degrees of accuracy, with higher order shape functions providing a more accurate representation of the geometry. In certain aspects of the present disclosure, such shape functions are assumed to be of a polynomial form with their basis including sets of monomials. It is contemplated that the sets of monomials may be different for different geometry types of mesh elements.

Lagrangian, Serendipity and Hierarchical type elements may be described using polynomials of different orders, with higher order polynomials, including higher order monomials, typically being able to more accurately interpolate a function than lower order polynomials. The different orders of elements and functions can be referred to as zeroth, first, second, third, fourth, fifth . . . , nth order elements and functions. For certain aspects, the operation of a simulation computing system is improved where the system is configured to compare the accuracy of shape functions of different orders and function type.

Within a function type, comparison of the accuracy of shape functions is contemplated. For example, higher order Lagrangian elements of a specific geometry type provide a more accurate interpolation than Lagrangian elements of a lower order. The same is true for Serendipity type elements and for Hierarchical elements. In another example, comparing the accuracy between different function types of the same order, Lagrangian elements of a specific order provide higher or equal—for zeroth and first order elements, and for simplex elements—accuracy than Serendipity elements. Comparing the accuracy for a specific geometry type of element between Lagrangian and Serendipity type elements where the Serendipity type elements are of a higher order than the Lagrangian type elements is more complex. Since both the Lagrangian and Serendipity type elements are expressed as polynomials, including a sum of monomials, the comparison may be performed for instance by comparing the included monomials of a Lagrangian-type element and the included monomials of the Serendipity-type element. If the monomials of one of the elements are a strict subset of the monomials of the other element, then the accuracy of the one of the elements is lower than the accuracy of the other element. It is also possible that: (i) one or more of the monomials of the Lagrangian-type element are not included in the set of monomials of the Serendipity-type element; and (ii) one or more of the monomials of the Serendipity-type element are not included in the set of monomials of the Lagrangian-type element. This situation may occur for instance in comparing a third order Lagrangian-type element with a fourth order Serendipity-type element. In this exemplary aspect, the accuracy may be said to be indeterminate, or the accuracy ordering between such elements may be set according to some other criteria. It is contemplated that in cases where the accuracy order between two or more shape function spaces can be considered to be indeterminate, more than one ordering of shape function spaces, according to accuracy ordering may be feasible. In a desirable aspect, the accuracy ordering of shape function spaces may be pre-determined—or related to instructions in, or associated, with the simulation system—to provide consistent accuracy order of the shape function spaces, such as the accuracy ordering of shape function spaces following the principles described herein.

A desirable aspect of the present disclosure and improvement to the operations of a simulation computing system for modeling physical system can include the use or application of one or more lists of shape function spaces, where the shape function spaces are ordered according to accuracy. Such shape function lists may be stored in simulation system memory unit(s) and processed using one or more simulation system data processing units.

It is contemplated that determining if the monomials of one shape function space are a subset of the monomials of another shape function space can be desirable and beneficial for certain physics or multiphysics finite element simulations. For example, in certain aspects, one or more indices representative of monomials of polynomials expressing shape function spaces may be used. Such indices may be associated with the items in shape function space lists. By comparing such indices (e.g., indices associated with items in a shape function space list), using one or more simulation system data processing units, it is contemplated that a determination can be made whether a shape function space is a subset of one or more other shape function spaces. Non-limiting examples of uses and comparisons of such indices are described.

A finite element is said to be iso-parametric if its dependent variable shape function space is identical to its geometry shape function space. A finite element is said to be sub-parametric is if its geometry shape function space is a strict subset of its dependent variable shape function space. A finite element is said to be super-parametric in all other cases.

For certain dependent variables in physics (including multiphysics) simulations, such as solid mechanics simulations (and other types of simulations), it is contemplated that super-parametric finite elements may be undesirable from a numerical accuracy point of view. One example of this undesirability is for rigid body displacement where some mesh element(s) have non-linear edges. For such simulations, numerical accuracy may be improved by using a geometry shape function space that does not create super-parametric finite elements, for instance, by using a lower order geometry shape function space. For other dependent variables in physics or multiphysics system interfaces, super-parametric finite elements may provide an acceptable numerical accuracy. It would therefore be desirable to include operations in a simulation computing system for modeling physical systems for constructing a discretized representation of a physical system that includes no super-parametric finite elements when physics or multiphysics interfaces are used with dependent variables that may be problematic with super-parametric finite elements. A desirable method or system, for modeling physical systems, including dependent variables that may be problematic with super-parametric finite element is to include for mesh constructions to be at least partially automated, and for the physics interfaces to have predetermined settings for whether or not its dependent variables accept or do not accept super-parametric finite elements. Representations for such a predetermined setting may be received by one or more simulation processing units. The setting can then provide instructions to the simulation processing units, that also discretize a physics or multiphysics model, to not construct any super-parametric finite elements for dependent variables for which super-parametric finite elements are not acceptable. It is further desirable for such a method or system to also operate where finite elements including shape functions of more than one type (for instance using both serendipity and Lagrange shape function spaces of second order or higher) can be applied.

Sub-parametric finite elements may be used in modeling operations, though in some aspects, they may provide a less accurate approximation of the actual geometry of the physical system being modeled. If sub-parametric finite elements are used, it may be desirable to use a geometry shape function space that provides a more accurate approximation of the actual geometry where such a geometry shape function space can be defined on the finite element(s). Thus, a desirable aspect of the present disclosure can include selecting a geometric shape function space, such that there are no finite elements that are super-parametric if a finite element includes one or more dependent variables for which super-parametric finite elements are undesirable. Another desirable aspect of the present disclosure, may also include selecting a geometric shape function space such that the geometric shape function increases or improves accuracy in modeling a physical system. In some aspects, that accuracy can be maximized subject to practical computational or engineering solution limitations.

For certain aspects, it is contemplated that higher order geometry shape function spaces are desirable on boundaries of geometries of the physical systems being modeled. In some aspects, it is contemplated that it may be advantageous to apply determinations of finite elements using common shape function spaces to model boundaries of the physical systems being modeled. It is further contemplated that in some aspects for methods involving a moving mesh, such as Arbitrary Lagrange Euler (ALE) methods, non-boundary elements may benefit from using higher order geometry shape function spaces. It is yet further contemplated that for methods not involving a moving mesh, higher order geometry shape function spaces may be beneficial, for instance, if the geometry includes a hole with a high degree of curvature in comparison to the size of the bordering mesh elements.

Figures 6A, 6B, 9:
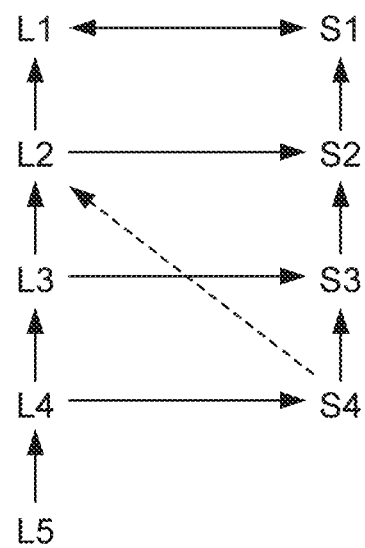
FIGS. 6A and 6B provide exemplary tables listing the order of geometry shape function space that may be used with a curl shape function space or a divergence shape function space, respectively, without creating super parametric finite elements, according to aspects of the present disclosure.
FIG. 9 illustrates exemplary subset relationships between shape function spaces with arrows pointing at shape function spaces that are subsets of the shape function spaces the arrows originate from, according to aspects of the present disclosure.

In some aspects, simulations for modeling a physical system may involve curl and/or divergence. For example, relationships between the order of a geometry shape function space representing the geometry of a physical system being modeled, and the order of the curl shape function space or the order of the divergence shape function space representing curl or divergence may be different from the relationship between the geometry shape function space and the dependent variable shape function space. Referring now to FIG. 6A, a table 601 is presented showing the relationship of highest geometry shape function orders to various orders of curl shape function spaces that may be applied as part of to simulation. The maximum geometry shape function space order shows what geometry shape function order may be used for representing the geometry of the physical system being modeled, if a curl shape function order of 1, 2, 3 or 4 is used, respectively. It is contemplated that the maximum geometry shape function order may be expressed through a mathematical expression where a non-limiting example of such an expression may be: Maximum Geometry Shape Function=(Curl Shape Function Order+1)/2 rounded down to nearest integer.

Referring now to FIG. 6B, a table 602 is presented showing the relationship of highest geometry shape function orders to various orders of divergence shape function spaces. The maximum geometry shape function space order shows what geometry shape function order may be used for representing the geometry of the physical system of the physical system being modeled, without causing super-parametric finite elements, if a divergence shape function order of 1, 2, 3 or 4 is used, respectively. It is contemplated that the maximum geometry shape function order may be expressed through a mathematical expression where a non-limiting example of such an expression may be: Maximum Geometry Shape Function=(Divergence Shape Function Order+2)/3 rounded down to nearest integer.

It is further contemplated that curl or divergence may be represented using dependent variable shape function spaces. For certain aspects of the present disclosure, it is desirable for a physics simulation system to provide or display one or more lists of geometry shape function spaces (implemented or selectable and representing the geometry of the physical system being modeled) with the geometry shape function spaces being listed in order of accuracy. In some aspects, the lists of geometry shape function spaces may be ordered from lower accuracy to higher accuracy or from higher accuracy to lower accuracy.

In certain aspects of a simulation system, it may be desirable for physics interfaces to include a setting to determine if one or more of the dependent variables included in the physics interface accept or do not accept super-parametric finite elements. In one aspect, such a setting is predetermined and may in some aspects be available to a user as an option available for user selection or available through display on an electronic display device. It is also contemplated that in some aspects the physics interface may also display to a user an indication that super-parametric finite elements are not available.

In certain aspects, a physics interface of a simulation system may provide a setting to determine what the highest acceptable geometry shape function space order is for one or more of the dependent variable shape function spaces (dependent variable shape function spaces including shape function spaces that may describe curl and divergence) included in the interface/system. Such a setting may be predetermined but some viewable or user-selectable aspects may also be made available to a system user.

Additionally, it may be desirable in certain aspects for a physics simulation system to provide or display one or more lists of dependent variable shape function spaces that can be implemented or are user-selectable and represent dependent variables. In one aspect, such shape function spaces are accessible and selectable by a user through a graphical user interface (GUI), using one or more drop down menus or combo boxes, or some other type of GUI item may be used for the selection. It is contemplated that in certain aspects a physics interface of a simulation system may have a default dependent variable shape function space for each or for all dependent variables included in the physics interface for the physical system being modeled.

Geometry shape function spaces can be associated with one or more lists including, for example, first sets of shape function indices indicative of the monomials forming the geometry shape function spaces. In some aspects, such indices can be tuples of the exponents of coordinate variables of the monomials where a set of such tuples for shape function spaces may be referred to as a tuple set. Non-limiting exemplary aspects of tuple sets for first, second, and third order Lagrange and Serendipity shape functions for quadrilateral elements are illustrated in two dimensions in FIG. 4. Other combinations of tuple sets are contemplated based on, among other things, the shape function space and dimensions. While other indices are contemplated, one advantage of using the described shape function indices is that the indices can be formed for any polynomial type shape function space.

Another example of shape function indices indicative of the monomials forming a shape function space are indices corresponding to shape function types (such as Lagrange or Serendipity), as well as, the order of the shape function types (such as first order/linear, second order/quadratic, third order/cubic, and so on). A set of such shape function indices may be formed for some or all indices corresponding to shape function spaces that are subsets of the shape function space. Non-limiting exemplary aspects of such indices are shown in FIG. 5. The indices indicate shape function type (in this case using L for Lagrange and S for Serendipity) and additionally indicate shape function order (in this case using 1 for first order, 2 for second order etc.). Other symbols or combinations of symbols would achieve a similar purpose and the particular choice of symbols in the illustrative and non-limiting example of FIG. 5 is chosen for clarifying purposes. An advantage of such shape function indices is that each shape function space that is a subset of a given shape function space is indicated directly through its associated index. It also simplifies the creation, for example, of a corresponding graph showing subset relationships of different shape function spaces.

A geometric representation of a physical system being considered for modeling and/or simulation may be constructed using a drawing tool in a physics simulation system, or using a computer aided design (CAD) system that may or may not be linked to the physics simulation system. Geometric representations may also be imported into the physics simulation system. In some aspects, the geometric representation may or may not be discretized.

In certain aspects, a desirable feature of the present disclosure can include a user providing inputs received by selection and input tools such as keyboard, mouse, drawing pad/tablet, touch screen, or body part movement tracking features allowing a user to interact with a physics simulation computing system with physics interfaces. The system can also allow a user to indicate selections or inputs through selection menus, combo boxes, check boxes, edit fields, input fields, buttons or other input or selection options included in a graphical user interface for the physics interfaces.

Any exemplary method implemented on a physics simulation system is now described for modeling physical systems. In some aspects, a preliminary and optional step includes a user using selection or input tools to indicate on what parts of the geometric representation one or more dependent variables, or boundary conditions are defined. The selection or input tools can allow user interaction (and related electronic inputs) with a displayed geometric representation, a selection menu, and/or input fields or edit fields, some or all of which are included in the GUI of one or more physics interfaces. In some aspects, the user may define that the geometry shape function spaces should be selected and set by the simulation system, leading to the system selecting and setting geometry shape functions used in the creation of finite elements, as described in this disclosure. In one non-limiting aspect, the simulation system selects and sets geometry shape functions as a default setting. It is further contemplated in some aspects that the physics interface or the simulation system may additionally apply a setting (associated with one or more parts) with the setting stating if the dependent variables associated with the physics interface accepts super-parametric elements or not.

As an alternative there may be a list of dependent variables, the list additionally including data for each dependent variable if the dependent variables accept super-parametric elements or not (that is, the setting is not applied to the geometry as such). In some aspects, the physics interface may apply such a setting automatically.

As yet another alternative, there may be one or more lists of dependent variable shape functions spaces where the shape function spaces may be of various orders. For the listed shape function spaces there may be an associated listing of what is the highest order of geometry shape function space (possibly also referring to a shape function type, such as Serendipity or Lagrange) that can be used together with the dependent variable shape function to construct a finite element (without the finite element becoming super-parametric). The listing can be beneficial if the simulation uses curl or divergence shape function spaces, as such shape function spaces of a particular order may in some cases (but not necessarily all) require a geometry shape function space of a lower order than other dependent variables to avoid super parametric finite elements.

Figure 13:
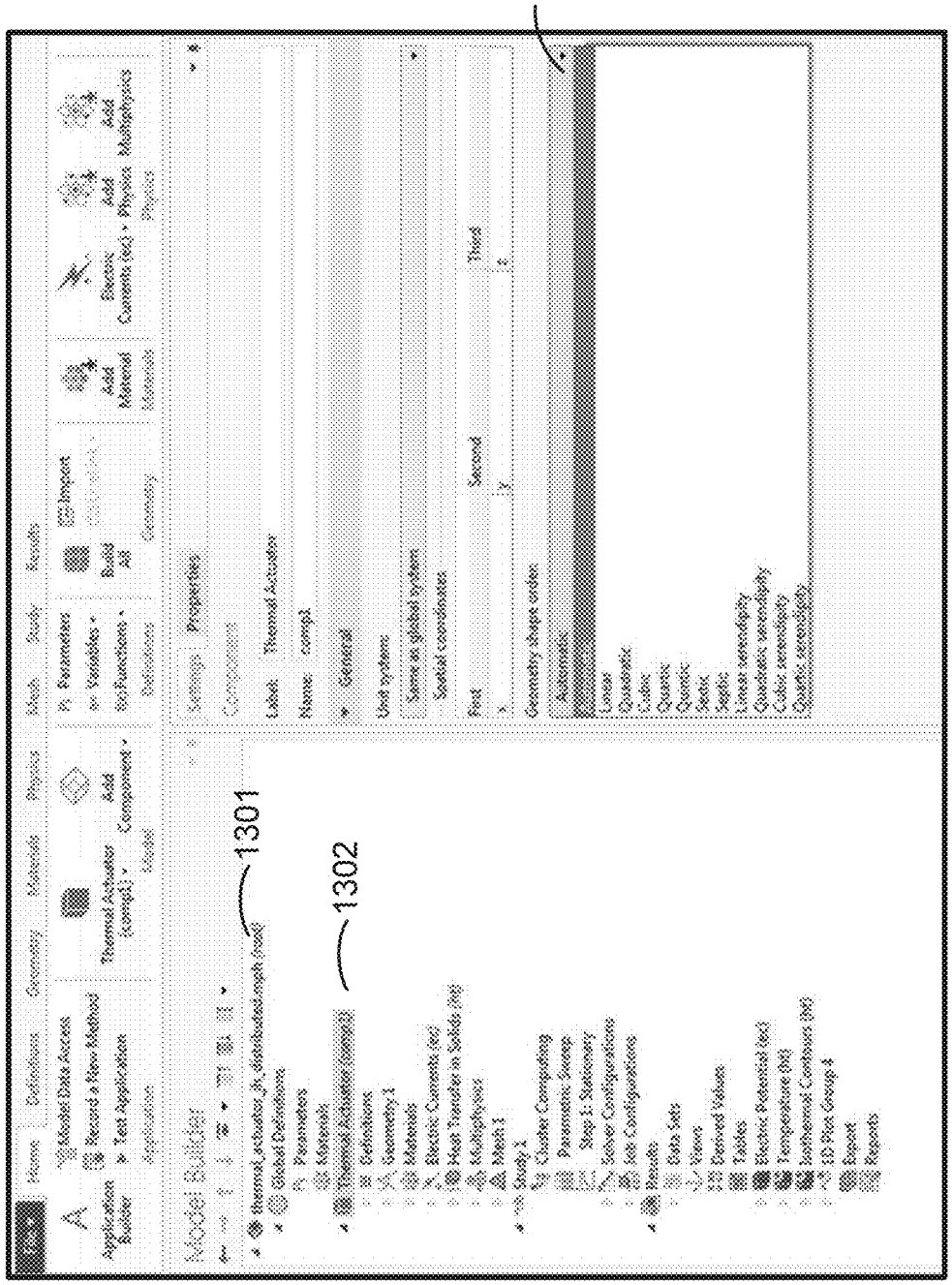
FIG. 13 illustrates an exemplary graphical user interface (GUI) settings window of a physics simulation system for selecting geometry shape function spaces and/or for indicating that the geometry shape function spaces are to be selected and defined by the physics simulation system, according to aspects of the present disclosure.

A non-limiting example of a GUI is illustrated in FIG. 13 that includes a model tree 1301 where a user may select a node 1302 representing the physical system being modeled, which in the non-limiting example is for a thermal actuator. In response to receiving the node 1302 selection, the exemplary simulation system may show a setting window, including a drop down menu including selectable geometry shape function spaces 1303. A number of options may be displayed for selection by the user. For example, the user may select "Automatic", which may also be a default setting in in certain aspects. In some aspects, in response to receiving the "Automatic" selection, the simulation system then selecting and defines geometry shape function spaces, in accordance the selected dependent variable shape function spaces and further can determine whether or not the associated dependent variables accept super parametric finite elements.

Figure 7:
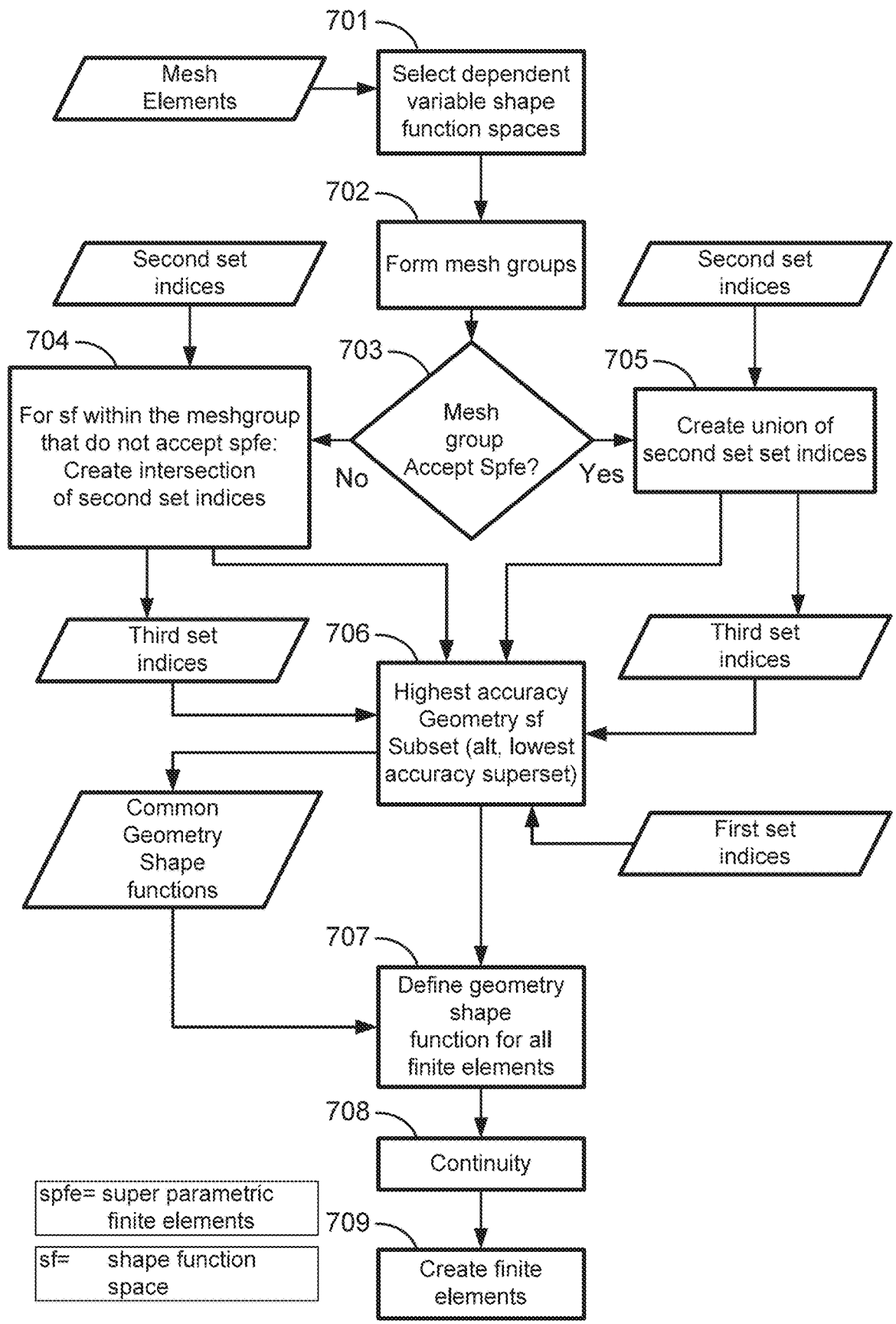
FIG. 7 illustrates a flow chart for an exemplary method for selecting common geometry shape function spaces that provides continuity between different types of finite elements when executed in a physics simulation system, according to aspects of the present disclosure.

Next, referring now to FIG. 7, a flowchart is illustrated for an exemplary method for selecting common geometry shape function spaces, that when executed in a physics simulation system, provides continuity between different types of finite elements, according to aspects of the present disclosure. In a first method step 701, a user may use selection and input tools to select a shape function type and a shape function order, for each defined dependent variable, thereby defining the dependent variable shape function space. It is contemplated that it may be possible to apply more than one shape function space to a dependent variable, so that the dependent variable is represented by different shape function spaces on different parts of the geometric representation of the physical system being modeled. It is contemplated that selections may be performed for example by using drop down menus, combo boxes, input fields or edit fields displayed in a GUI. If a user does not actively make a selection for one or more dependent variables, the physics interface may define one or more default dependent variable shape function spaces for said one or more dependent variables.

Figure 14:
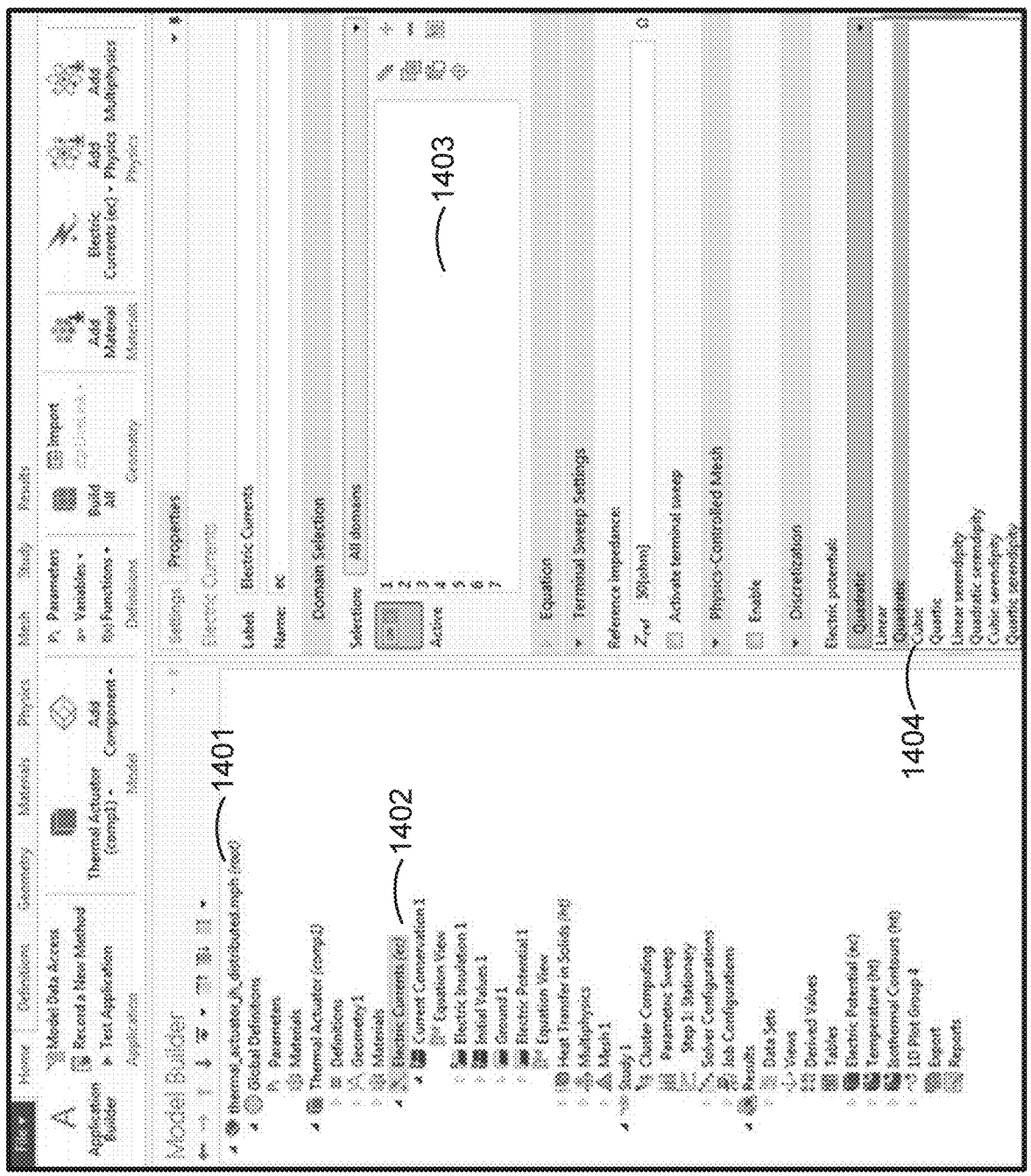
FIG. 14 illustrates an exemplary GUI settings window for selecting dependent variable shape function spaces in a physics simulation system for domains of a geometry representing a physical system, according to aspects of the present disclosure.

A non-limiting example of a GUI is illustrated in FIG. 14 that includes an exemplary model tree structure 1401 where a user may select a node 1402, which in this non-limiting example represents settings for modeling of electrical properties for the physical system. In response to receiving the selection of node 1402, a number of options may be displayed to the user. For example, the simulation computing system may display a settings window to the user. The settings window may include a list of selectable domains 1403 representing various parts of a geometry representing a physical system and a drop down menu 1404 including selectable dependent variable shape function spaces for one or more of the dependent variables associated with the node 1402. In this non-limiting and illustrative example, the user has selected "Quadratic" 1404, resulting in quadratic Lagrange (e.g., in this example the dependent shape variable shape function space can be either Lagrange which is not displayed in the menu or Serendipity which is displayed in the menu) being the dependent variable shape function space representing the exemplary dependent variable, electric potential. In this illustrative example the user has defined the quadratic Lagrange shape function, representing the dependent variable electric potential, on all domains.

Figure 15:
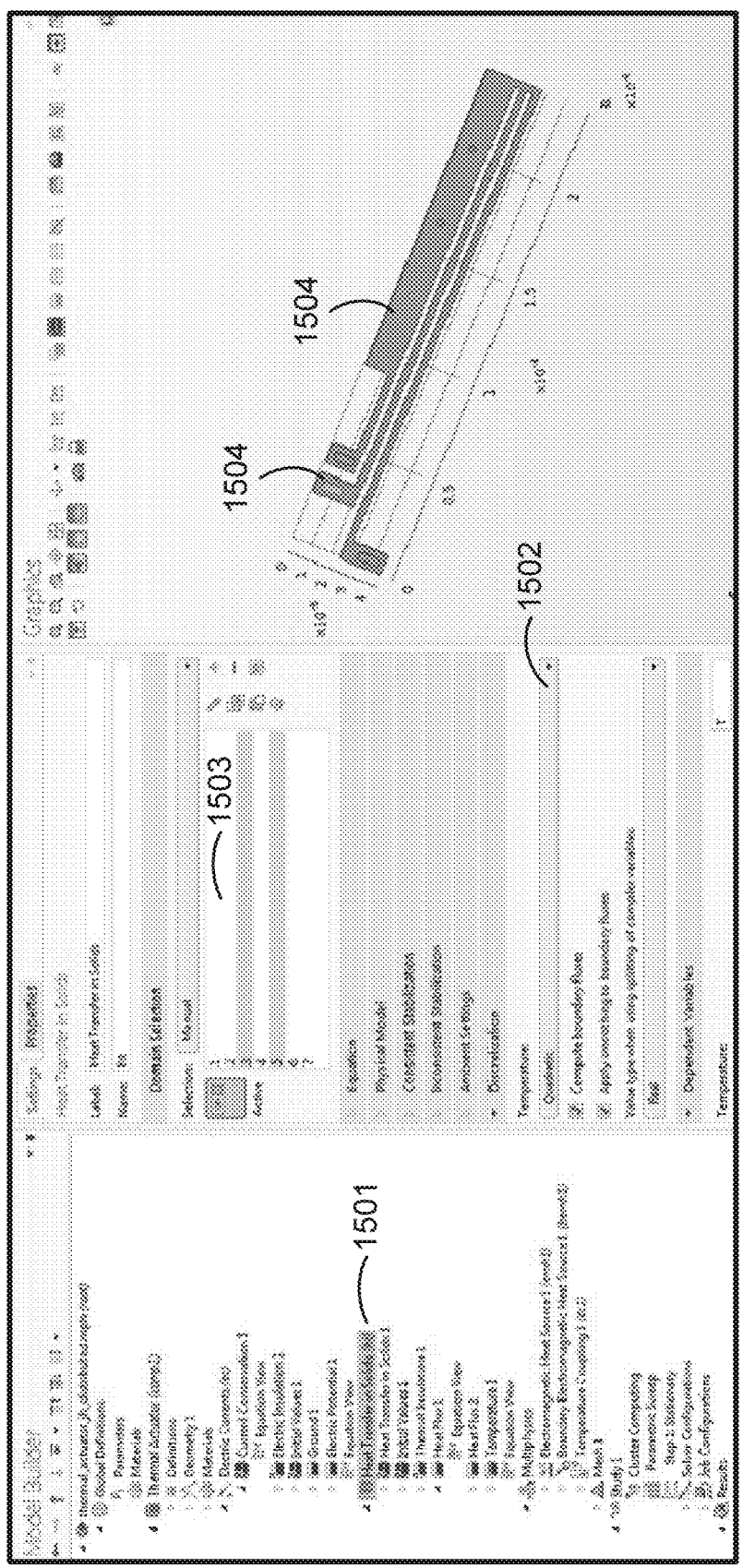
FIG. 15 illustrates an exemplary GUI settings window in a physics simulation system for selecting dependent variable shape function spaces for domains of a geometry representing a physical system with the exemplary aspect of two non-limiting specific domains being selected, according to aspects of the present disclosure.

Another non-limiting example of a GUI is illustrated in FIG. 15 that also includes an exemplary model tree structure. In this non-limiting and illustrative example, the user has selected a node 1501 associated with settings for modeling heat transfer in solids. In this case the user has selected quadratic Lagrange as dependent variable shape function space using a drop down menu 1502, and additionally defines, by making selections in the list of domains 1503, that the quadratic Lagrange shape function, representing the dependent variable temperature, should be defined only on two specific domains 1504 of the physical system being modeled.

Figure 16:
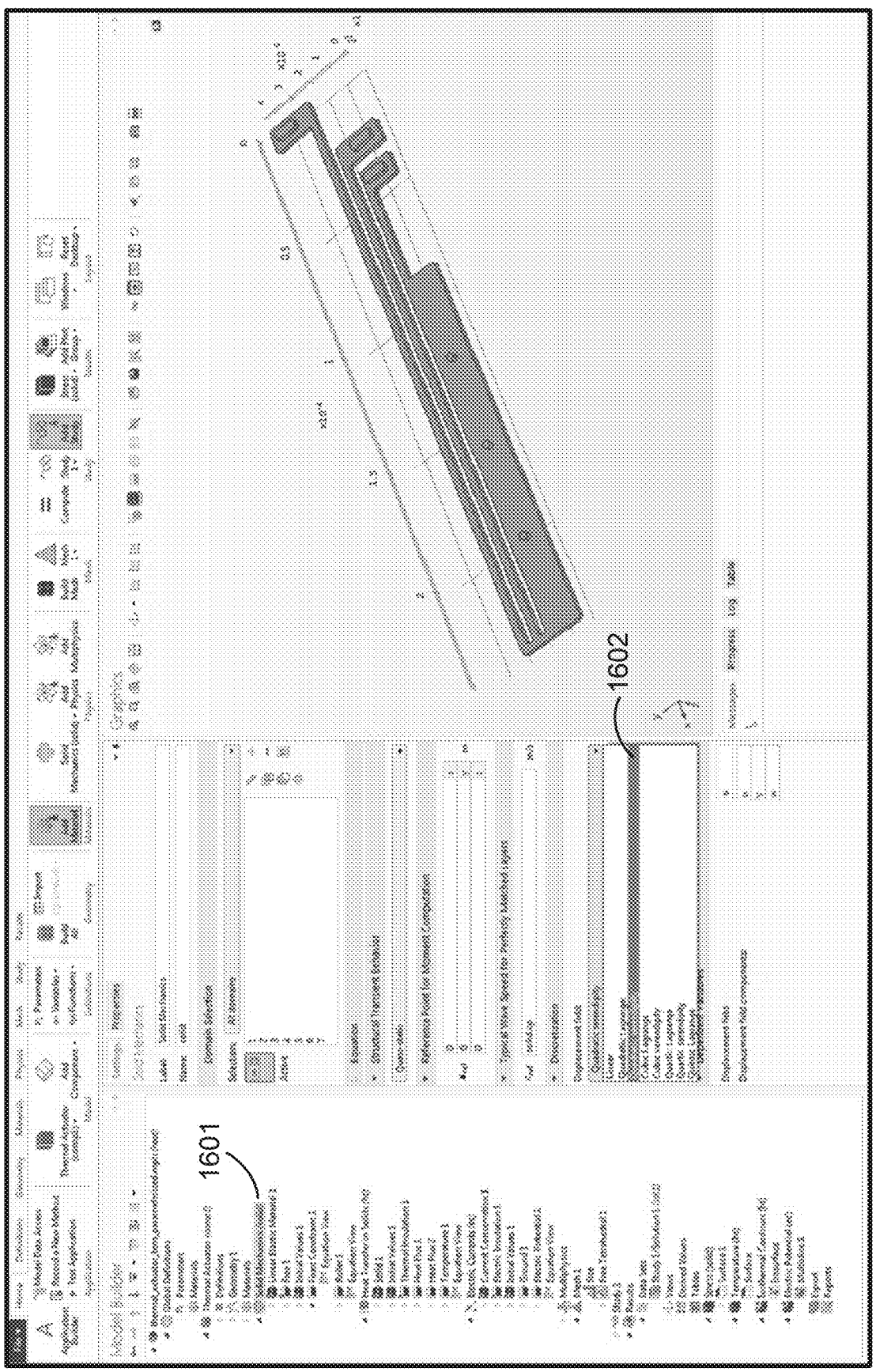
FIG. 16 illustrates another exemplary GUI settings window in a physics simulation system for selecting dependent variable shape function spaces for domains of a geometry representing a physical system, according to aspects of the present disclosure.

A further non-limiting example of a GUI is illustrated in FIG. 16 that also includes an exemplary model tree structure. In this non-limiting and illustrative example, an electronic input has been received representing a user selection of node 1601 associated with settings for modeling structural mechanics for the physical system. This illustrative and non-limiting example of FIG. 16 is for a multiphysics simulation where the other physics being modeled include temperature and electric potential. Additional electronic inputs have been received by the system representing a user selection of quadratic serendipity as a dependent variable shape function space from options presented in a drop down menu 1602. The exemplary selected dependent variable shape function space represents a displacement field, being defined on all domains.

Referring back to the flowchart of FIG. 7 and the exemplary method implemented on a physics simulation system, in a second optional method step 702 (where there are a plurality of mesh groups), the mesh and the associated dependent variable shape function spaces for the model of the physical system may be partitioned into mesh groups. If the geometric representation of the physical system being modeled was not previously discretized using a mesh, it may be discretized prior to this second method step. The mesh and associated dependent variable shape function spaces can be partitioned into mesh groups such that: (a) each mesh group includes one geometry type of mesh element; (b) within each mesh group, a dependent variable is either defined on all mesh elements within the entire mesh group, or it is not defined anywhere within the mesh group; (c) if the dependent variable is defined within the mesh group, it is represented using the shape function space selected in method step two; and (d) each mesh group relates to/is associated with settings associated with each of the dependent variables in the mesh group, the settings stating whether the associated dependent variables accept super-parametric finite elements or what is the highest order geometry shape function space that may be used when creating a finite element. For dependent variables (and curl and divergence) that accept super parametric finite elements, the order may be set to infinite or an order that is high enough that any implemented geometry shape function space may be used.

Figure 10:
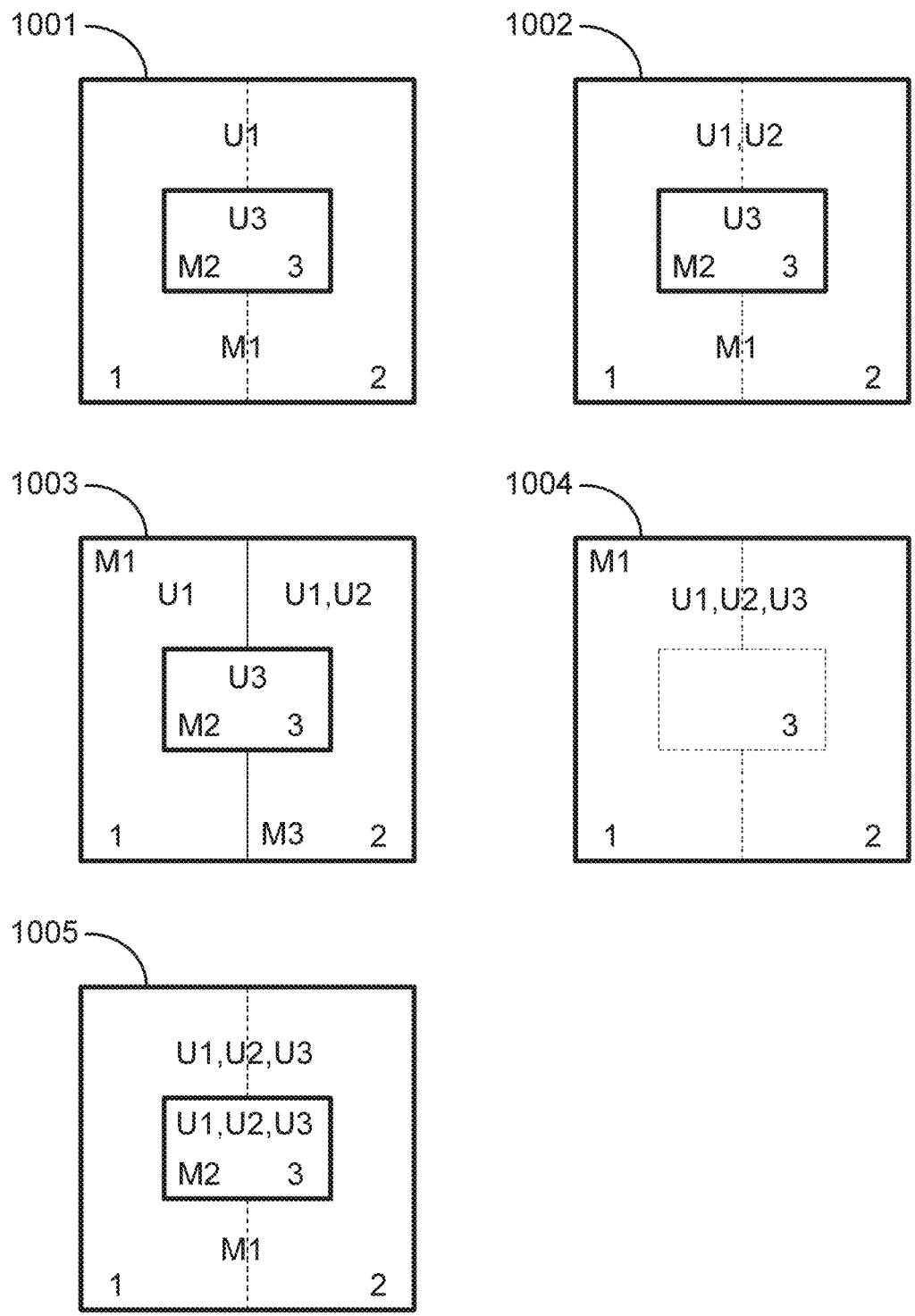
FIG. 10 provides illustrative non-limiting examples of constructing mesh-groups, according to aspects of the present disclosure.

Referring now to FIG. 10, exemplary aspects for the formation of mesh groups is illustrated with four non-limiting examples of a 2D geometry divided into domains 1, 2 and 3, which can be applied to geometries of different dimensions. Separation of domains is indicated by a dashed line or a solid line. In a first grouping 1001 two dependent variables U1 and U3 are defined on the geometry, U1 is defined on domain 1 and 2, but not on domain 3. U3 is defined on domain 3 but not on domain 1 or 2. All domains are meshed using the same type of mesh elements (e.g., as a non-limiting example, quadrilateral mesh elements). As described elsewhere, this leads to two mesh groups, which, for first grouping 1001 is indicated by solid lines. One mesh group, M1, includes the domains 1 and 2 and U1 dependent variable shape function space. The other mesh group (M2) includes domain 3 and U3 dependent variable shape function space.

Second grouping 1002, provides another non-limiting example, and assumes another dependent variable U2 is defined on domain 1 and domain 2 of the illustrated geometry. It is contemplated that mesh-group M1 will then still include domains 1 and domain 2, and further include both dependent variable shape function space U1 and dependent variable shape function space U2. Mesh group M2 remains unchanged between first and second groupings 1001 and 1002.

By way of another non-limiting example, assume the U2 variable is instead defined on only domain 2, as shown in third grouping 1003. It is contemplated that the mesh groups change so that the mesh group M1 includes only domain 1 and the U1 dependent variable shape function space. The M2 mesh group remains unchanged, and a mesh group M3 is created, which includes domain 2 and the U1 and U2 dependent variable shape function spaces.

By way of another non-limiting example, assume now that dependent variables U1, U2 and U3 are all defined on domains 1, 2 and 3 as shown in fourth grouping 1004. Applying rules for mesh group formation, there is one mesh group M1, including domains 1, 2 and 3, and including the U1, U2 and U3 dependent variable shape function spaces.

By way of another non-limiting example, assume now that the type of mesh used for domain 3 is changed to triangles while the type of mesh used for domains 1 and 2 remains quadrilateral as shown in fifth grouping 1005. Assuming U1, U2, and U3 are defined on all domains, this leads to two mesh groups, M1 including domains 1 and 2 and the U1, U2 and U3 dependent variable shape function spaces. Mesh group M2 includes domain 3 and U1, U2 and U3 dependent variable shape function spaces.

In some aspects, it is contemplated that each (with some exceptions) dependent variable shape function space in a mesh group may be associated with a second set of shape function indices indicative of the monomials forming shape function spaces, where the second set of shape function indices are representative of the dependent variable shape function spaces. One example of such described indices would be tuples of the exponents of the coordinate variables of the monomials, where a set of such tuples for shape function spaces may be referred to as a tuple set. Non-limiting illustrative examples of such tuple sets for first, second, and third order Lagrange and Serendipity quadrilateral elements in two dimensions were previously discussed and described in relation to FIG. 4. One advantage of using the described indices is that the indices are easily formed for any polynomial type shape function space.

Another example of indices indicative of the monomials forming a shape function space are indices corresponding to shape function types (such as Lagrange or Serendipity), as well as, the order of the shape function types (such as first order/linear, second order/quadratic, third order/cubic, and so on). A set of such indices may be formed of all indices corresponding to shape function spaces that are subsets of the shape function space. Non-limiting illustrative are shown in FIG. 5, where the indices indicate shape function type (in this case using L for Lagrange and S for Serendipity) and additionally indicate shape function order (in this case using 1 for first order, 2 for second order etc.). Various other symbols or combinations of symbols would achieve a similar purpose and the particular choice in this example is chosen for clarity purposes. An advantage of such indices is that each shape function space that is a subset of a given shape function space is indicated directly through its associated index. It also simplifies the creation of a corresponding graph showing subset relationships of different shape function spaces. For quartic Serendipity shape functions the L2 index is shown in italics. Whether second order Lagrange shape function spaces are a subset of quartic Serendipity shape function spaces can depend on the implementation and on what type of mesh element it is used.

In some aspects, it is contemplated that some types of dependent variable shape function spaces may not interact with geometric shape function spaces (for instance Argyris, Hermite, and Gaussian point shape function spaces). Such dependent variable shape function spaces may not be associated with a second set of shape function indices, which will effectively minimize or exclude their influence on finding common geometric shape function spaces. Such dependent variable shape function spaces (i.e., that do not interact with geometric shape function spaces) may be defined on finite elements with predefined shape function spaces. Predefined finite elements including a predefined combination of geometry shape functions and dependent variable shape functions fall outside of the scope of present application.

Referring back to the flowchart of FIG. 7 and the exemplary method implemented on a physics simulation system, in a third optional method step 703 (where there a plurality of mesh groups), for each mesh group a control is performed checking if the mesh group includes a setting that one or more of the dependent variables do not accept super-parametric finite elements. Stated another way, if one or more of the dependent variables shape function spaces in the mesh group is listed as not accepting one or more of the geometry shape function spaces, where the result of such a control is positive, the simulation computing system may form a third set of shape function indices at step 704 (which is the intersection of the second sets of shape function indices associated with the dependent variable shape function spaces in the mesh group that do not accept super-parametric finite elements). For each mesh group, such a third set of shape function indices may be stored in a physical memory or storage unit. If the control performed in step 703 is negative (that is, if all dependent variables within the mesh group accept super-parametric finite elements) the simulation computing system may form a third set of shape function indices as part of proceeding to step 705, which is the union of the second sets of shape function indices associated with the dependent variable shape function spaces in the mesh group.

Referring now to FIG. 11, an illustrative and non-limiting example of a rectangular 2D geometry 1101, meshed (not shown) with quadrilateral elements is shown where said geometry includes exemplary mesh groups M1 and M2. FIG. 11 provides an example of constructing third sets of shape function indices and is merely illustrative of one non-limiting example of how the steps described in steps 704 and 705 of FIG. 7 may be implemented.

As displayed in geometry 1101, the M1 mesh group includes dependent variable shape function spaces U1, U2 and U3. The M2 mesh group includes dependent variables U1 and U4. As shown in table 1102, U1 and U4 can accept super parametric finite elements, but U2 and U3 do not accept super parametric finite elements. U1 is represented using a linear (i.e., first order) Lagrange shape function space, U2 is represented using a cubic (i.e., third order) Serendipity shape function space, U3 is represented using a quadratic (i.e., second order) Lagrange shape function space, U4 is represented using a cubic (i.e., third order) Lagrange shape function space. Non-limiting exemplary second sets of shape function indices, associated with their respective shape function space are shown in the fourth column of table 1102. Another non-limiting and illustrative example would be to use second sets of shape function indices as previously shown in FIG. 4 (with {(0,0), (1,0), (0,1), (1,1)} corresponding to L1, S1 for instance).

Since the M1 mesh group in FIG. 11 includes dependent variables that do not accept super parametric finite elements, an intersection of the second set shape function indices associated with the dependent variable shape function spaces for U2 and U3 is computed by the simulation system as earlier described in FIG. 7, element 704. In this example, note that the second set shape function indices associated with U1 in FIG. 11 is not involved in determining the intersection since U1 accepts super parametric shape function spaces.

In this example, it is also noted that M2 in FIG. 11 only includes dependent variables that accept super-parametric finite elements, hence a union of the U1 and U4 associated second sets of shape function indices is determined by the simulation system as earlier described in FIG. 7, element 705. Referring again to FIG. 11, the third set of shape function indices determined by the simulation system for M1 and M2 respectively are shown in table 1103.

Next, the exemplary method proceeds to the fourth method step 706 where for each mesh group the simulation computing system compares the one or more first sets of shape function indices, with the third set of shape function indices. The computing system may select one first set of shape function indices meeting a defined criteria, such as meeting a requirement that it is a subset of the third set of shape function indices. In some aspects, the one selected first set of shape function indices may be the set of first shape function indices associated with the geometry shape function space which are listed as having the highest accuracy.

In an alternative fourth method step 706, for each mesh group the simulation system may perform another control, checking if the mesh group includes a setting that one or more of the dependent variables do not accept super-parametric finie elements, or the result of the control from the third method step may be used. Alternatively the simulation system unit may perform a control, checking if any of the dependent variables included in the mesh group corresponds to a dependent variable listed or defined as not accepting super-parametric finite elements. If the result of the control is negative, the computing system may select one first set of shape function indices which is a superset of the third set. It is contemplated that the alternative fourth method step may be implemented for some third sets which are unions of shape function indices.

The alternative fourth method step 706 may be desirable as illustrated by an exemplary two-dimensional scenario. In this scenario, if the dependent variable shape functions are second order Lagrange and third order Serendipity, the base fourth method step would select the first set of shape function indices corresponding to either second order Lagrange, or third order Serendipity (depending on which is listed/defined as having the higher accuracy). However, since all dependent variable shape functions accept super-parametric finite elements, it may in some cases be desirable to use, for example, a third order Lagrange geometry shape function space. Using the alternative fourth method step, it may in some cases be preferable to use a first set of shape function indices which is a superset but has the lowest accuracy (that is as few extra monomials as possible). For some applications, however, higher accuracy geometry shape function spaces may be preferable. It is contemplated that a user may be able to select the based fourth method step, the alternative fourth method step, or another alternative fourth method step including selecting higher accuracy first sets of shape function indices. It is also contemplated that the simulation system may include default settings for when to use the base or alternative method steps. For example, the simulation system may include a setting to use the alternative fourth method step if there are mesh groups which include second order Lagrange and third order Serendipity dependent variable shape functions and the mesh groups include only dependent variables that accept super parametric finite elements. For some aspects, such as particle tracing simulation applications, it is contemplated that selection of higher order first sets of shape function indices may be set as default (as it may improve simulation of some collisions).

Referring now to FIG. 12, a non-limiting exemplary list 1202 of geometry shape function spaces listed in accuracy order from low accuracy to high accuracy is illustrated. FIG. 12 is merely illustrative of one non-limiting example of how the steps described in step 706 of FIG. 7 may be implemented. In some aspects, such an accuracy ordering may be pre-determined due to the accuracy ordering between some shape function spaces being indeterminate. Thus, it is contemplated that more than one ordering may be feasible. The accuracy ordering such as shown in FIG. 12, is considered a feasible accuracy ordering that may be used to determine common geometry shape function spaces(s). Using the simulation system, the 1202 list from FIG. 12 can be compared to the list of third set of shape function indices produced in FIG. 11 and reproduced as table 1201 in FIG. 12. Non-limiting illustrative tables 1103 (and 1201) are also associated with the performance of steps 704 and 705 from the flowchart on FIG. 7.

The third set of shape function indices for mesh group M1 from exemplary FIG. 12 is compared to the list of first shape function indices, such as the sets of indices for linear Serendipity, linear Lagrange, and quadratic Serendipity, which are all subsets of the third set of shape function indices for M1. Quadratic Serendipity is listed as having the highest accuracy so quadratic Serendipity is used as a common geometry shape function space for mesh group M1.

The third set of shape function indices for mesh group M2 is compared to the list of first sets shape function indices. In this case, the simulation system may search for the first set of shape function indices which is a superset to the third set of shape function indices for mesh group 2 and the lowest accuracy superset may be chosen. Accordingly the cubic Lagrange shape function space is used as a common geometry shape function space for mesh group M2.

Following step 706, a geometry shape function space is ready to be defined for each mesh group in step 707. However, before proceeding to step 707, in some aspects, an optional step of checking for continuity requirements between mesh groups may be performed where a model of a physical system includes a plurality of mesh groups.

Then, after the optional step, if any, of checking continuity requirements between mesh groups is completed, the method proceeds to step 707 where the simulation system defines the geometry shape function space selected in the fourth method step 706 as the common geometry shape function space for all mesh elements in the mesh group. In some aspects, the simulation system may then resolve continuity at step 708 (for models with a plurality of mesh groups) for node based geometry shape function spaces, such as Lagrange and Serendipity, by selectively removing degrees of freedom from higher order elements on mesh group boundaries meeting lower order mesh elements, introducing transitional function spaces for such elements. For geometry shape function spaces of so called hierarchical type, continuity is resolved by removing surplus higher order basis functions on mesh group boundaries where higher order mesh elements meet lower order mesh elements. Continuity may also commonly be referred to as compatibility, as in the book: Bathe, Klaus-Jürgen. *Finite Element Procedures*, pp. 377-378, Prentice-Hall, Inc., Upper Saddle River, N.J., USA, Klaus-Jurgen Bathe, 2006 (ISBN-13: 9780979004902). For example, pp. 377-378 of the Bathe reference discusses compatible elements using transitional elements (for instance 4-node to 8-node element transition).

Then, the exemplary method proceeds to the sixth method step 709, where finite elements are produced using the determined geometry shape function spaces and the determined dependent variable shape function spaces.

It is contemplated that in some aspects, a simulation computing system may lack an implementation for resolving continuity by modifying elements on mesh group boundaries. If this is the case, a geometry shape function space may be defined for all mesh groups, or at least for all adjacent mesh groups. In this case the method proceeds to alternative to fifth method steps 707 and 708 described in more detail below inin the context of FIG. 8.

Figure 17:
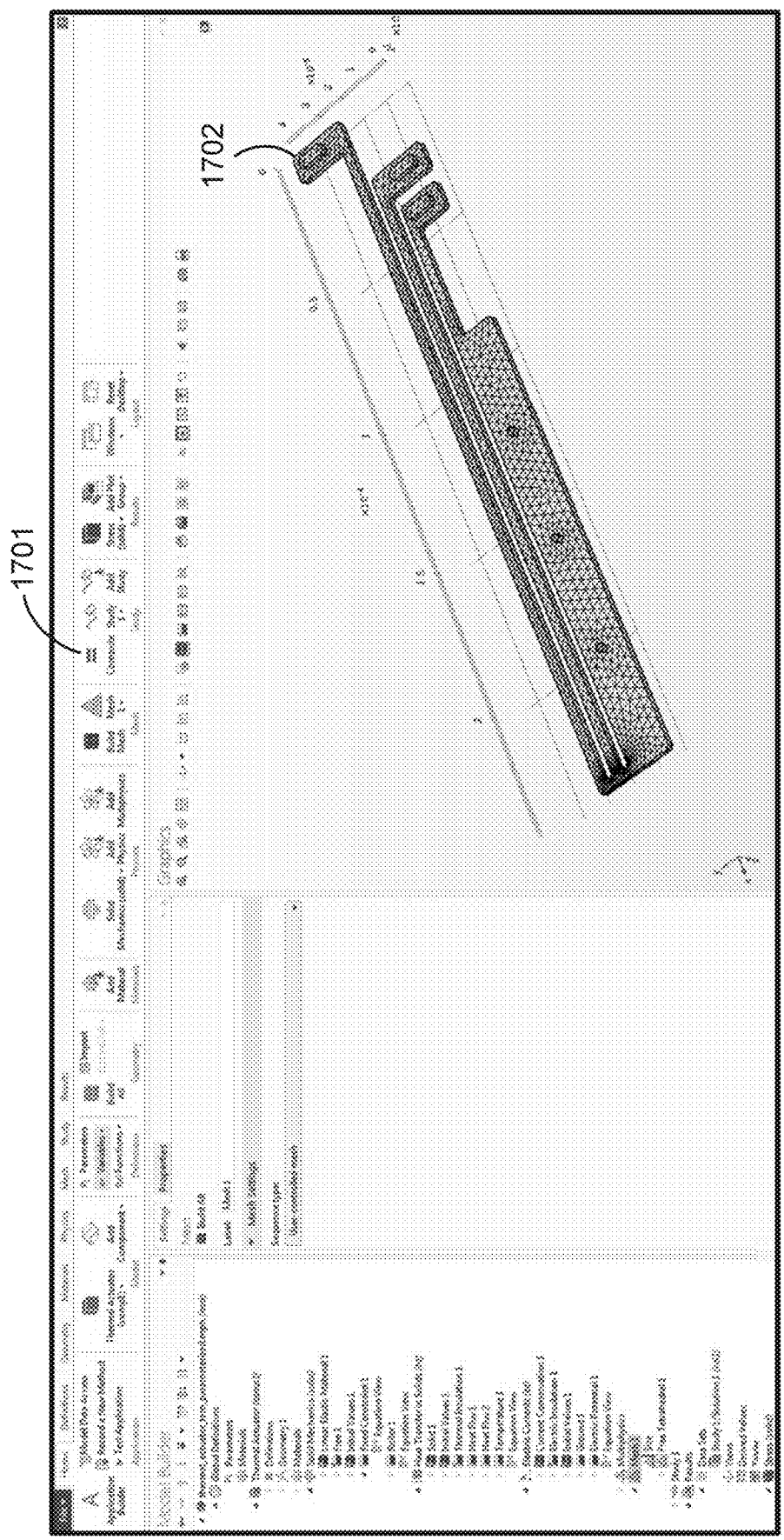
FIG. 17 illustrates an exemplary GUI in a physics simulation system including a representation of a mesh of the geometry of the physical system, according to aspects of the present disclosure.

Referring now to FIG. 17, in response to a user instructing the system to compute a solution to the model, such as by interacting and providing an input to a compute button 1701 in the GUI, the system may calculate a solution to the finite element model representing a physical system. In this non-limiting example, a solution for a thermal actuator model is computed. The finite elements used in the finite element modeling are constructed using a discretized representation of the geometry consisting of mesh elements 1702 with the geometry shape function space(s) selected by the system in accordance with the selected dependent variable shape function spaces (which are also used to create finite elements representing the dependent variables) and assessing whether or not the associated dependent variables accept super parametric finite elements.

Figure 18:
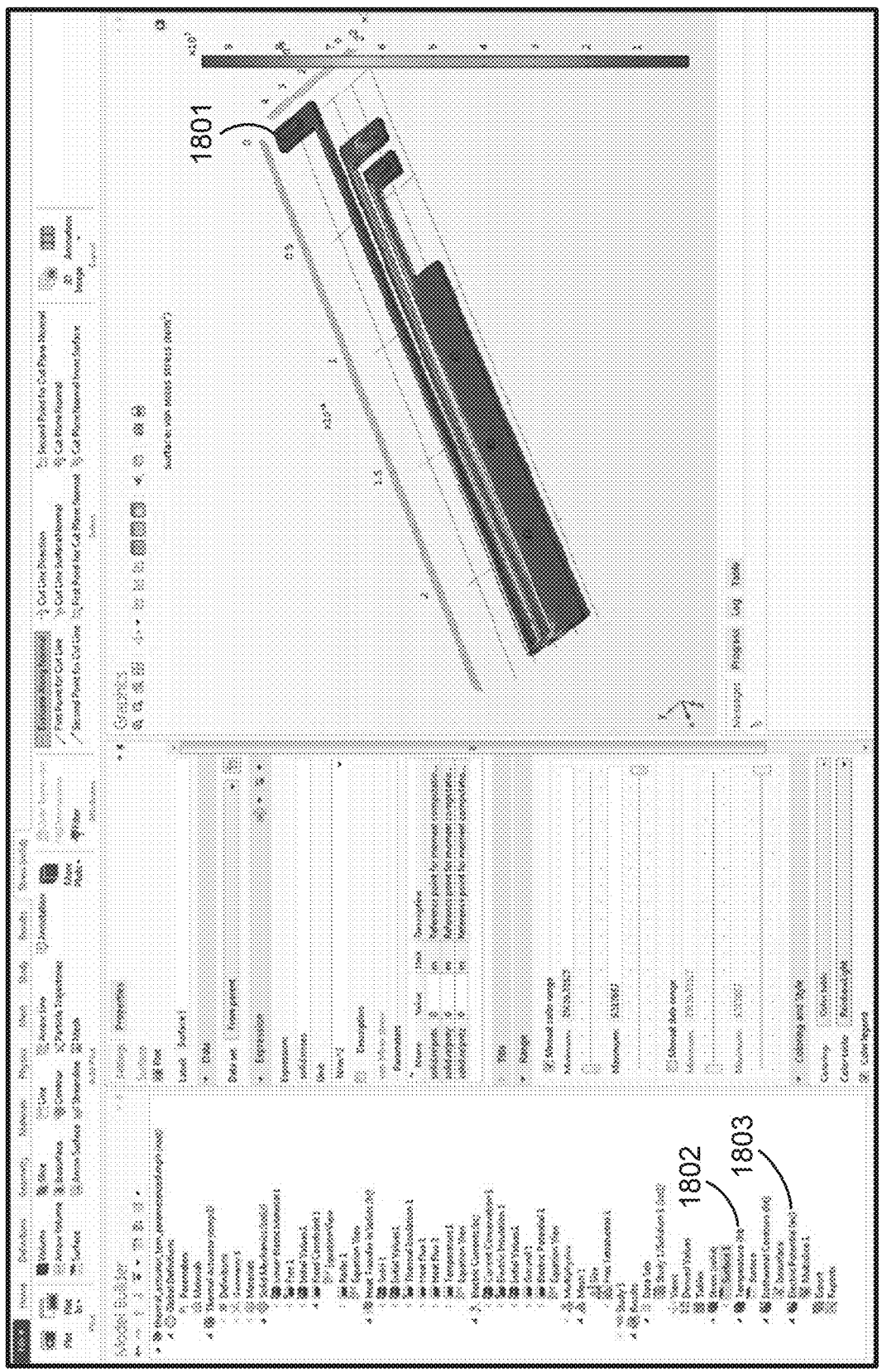
FIG. 18 illustrates an exemplary GUI in a physics simulation system including an exemplary solution to a finite element model in the form of a surface plot, according to aspects of the present disclosure.

Referring now to FIG. 18, the simulation system may solve the finite element model and present various representations of solutions in the form of plots, tables or other outputs that may illustrate values of dependent variables used in the finite element model, or derived values thereof. In this non-limiting example, an exemplary surface plot of the stress in the thermal actuator is illustrated 1801. Similar surface plots showing the temperature 1802, or electric potential 1803 may also be shown in response to a user instruction where the plots are based on the solution to the finite element model.

Figure 8:
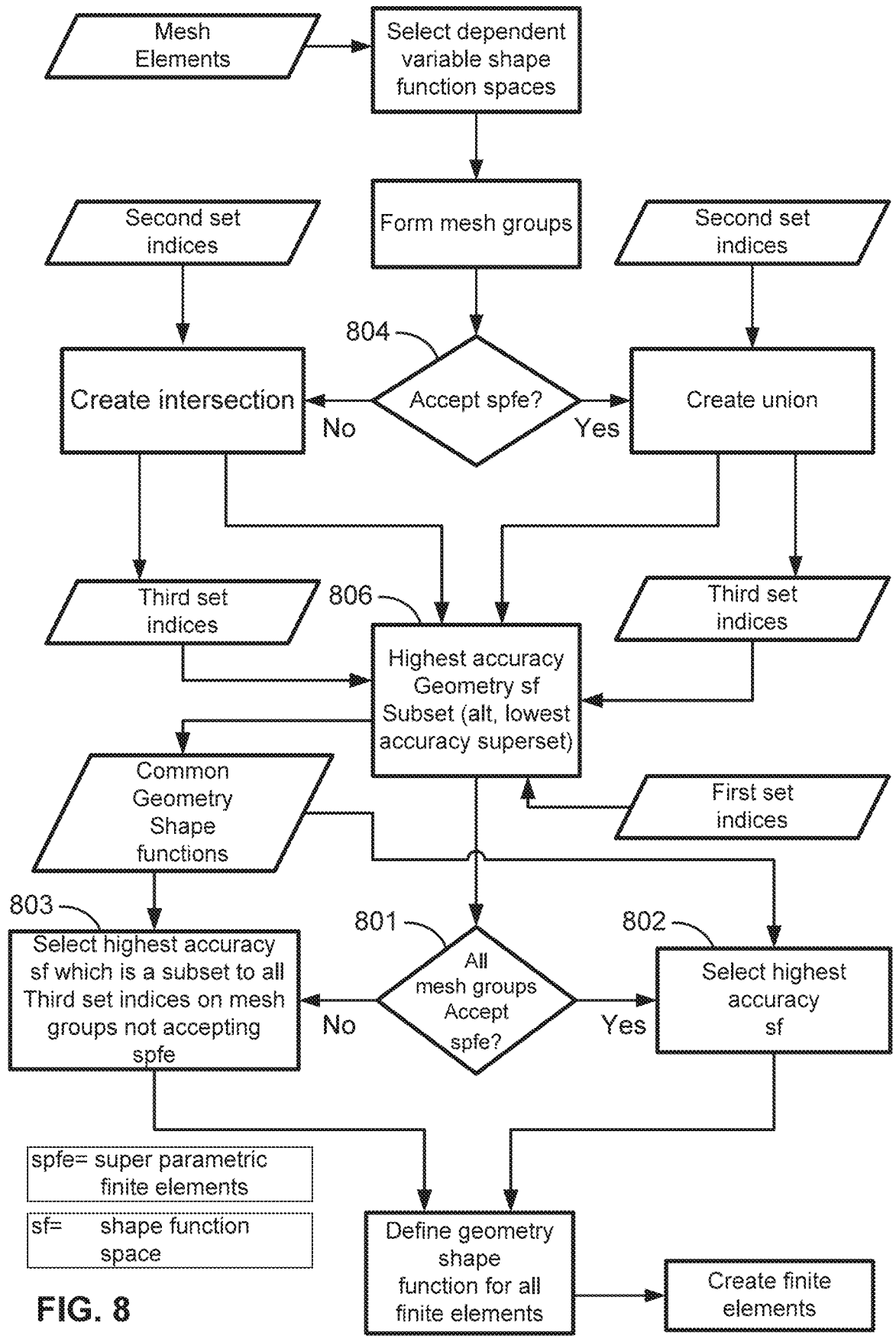
FIG. 8 illustrates a flow chart for an exemplary method for selecting common geometry shape function spaces including selecting a common geometry shape function space for all mesh groups when executed in a physics simulation system, according to aspects of the present disclosure.

Referring now to FIG. 8, a flow chart is illustrated for an exemplary method for selecting common geometry shape function spaces, that when executed in a physics simulation system, does not create continuity between different types of finite elements and instead provides for selecting a common geometry shape function space for all mesh groups, according to aspects of the present disclosure. FIG. 8 provides yet another alternative method for selecting a geometry shape function for all mesh elements. In an alternative fifth method step 801 (i.e., alternative to method steps 707/708 in FIG. 7), the simulation computing system may check if any of the mesh groups include a setting in which super-parametric finite elements are not allowed (possibly using the check from method step 804)). If no mesh group includes such a setting, the simulation system may proceed to step 802 and select the geometry shape function space from the fourth method step 806 which has the highest accuracy, and define it on all mesh elements and on all mesh groups, for constructing finite elements for the simulation. If on the other hand, one or more of the mesh groups include a setting in which super-parametric fnite elements are not allowed, the simulation system may proceed to step 803 to compare the one or more first sets of shape function indices to the third sets of shape function indices for all mesh groups including a setting that super-parametric finite elements are not allowed. The simulation system may select a first set of shape function indices meeting criteria that it is a subset of all third sets of shape function indices for mesh groups including a setting that super-parametric finite elements are not allowed. In some aspects, the simulation system may select the first set of shape function indices meeting the subset criteria, which is also associated with the geometry shape function which is most accurate, defining a common geometry shape function space to be used when constructing finite elements for the simulation.

In some aspects, rather than having the physics simulation computing system change the geometry shape function space, the simulation system may notify the user of which physics interfaces both use dependent variable shape function spaces that are strict subsets of a default or user-selected geometry shape function space, and where the dependent variables are associated with a setting stating that they do not accept super-parametric finite elements.

In some aspects, a warning or message may be displayed or provided to the user, explaining that the selected dependent variable shape function space may lead to decreased numerical accuracy. Additionally the simulation computing system can provide the user with guidance on how simulation-accuracy may be improved. For example, a user may be notified of which dependent variable shape function spaces are available in the physics interfaces that can be used without creating super-parametric finite elements. Additionally or alternatively the user may be notified of which geometry shape function spaces could be used without creating super parametric finite elements.

In certain aspects, physics interfaces as well as settings windows may be represented by nodes in a model tree. A symbol or message can be displayed associated with the node(s) representing the physics interface(s) including dependent variable shape functions that should be changed to prevent the creation of super-parametric finite elements.

A user or a simulation computing system may proceed with a simulation of a physical system using the common geometry shape function space improvements described in the present disclosure, which provides for improved numerical accuracy of the simulation.

Other implementations are contemplated for selecting a geometry shape function according to accuracy criteria and in accordance with which dependent variables (and/or curl or divergence) accept super parametric finite elements. In certain aspects, a graph for finding which shape function spaces are subsets to other shape function spaces can be applied. FIG. 9 provides an illustrative and non-limiting example of such a graph where L1, L2, L3, L4, and L5 refer to first, second, third, fourth and fifth order Lagrange shape function spaces, and S1, S2, S3, and S4 refer to first second third and fourth order Serendipity shape function spaces. Following the arrows, it is possible to go from one shape function space to any subset of said shape function (note how this corresponds to the exemplary monomial containment in FIG. 5). The dashed arrow indicates that whether L2 is a subset of S4 may be implementation dependent, and may depend on mesh element type. For example, L2 may not be a subset of S4 for quadrilateral mesh elements or for hexahedron mesh elements.

In some aspects, geometry shape functions can also be found through the implementation of various logical IF-statements that correspond to finding subsets to third sets of indices. For example, the simulation computing system may collect information on what is the lowest order dependent variable shape function space associated with a mesh group of Lagrange and Serendipity type respectively. The computing system may then use an appropriate IF-statement, with select non-limiting examples being provided below using notation described previously, and assuming one or more dependent variables on the mesh group do not accept super parametric finite elements (NA stands for not applicable). Non-limiting and illustrative examples include:

a. IF lowest Lagrange is L2 AND lowest Serendipity is S3 then common geometry shape function for mesh group is S2.
b. IF lowest Lagrange is L4 AND lowest Serendipity is S3 then common geometry shape function for mesh group is S3.
c. IF lowest Lagrange is L4 AND lowest Serendipity is NA then common geometry shape function for mesh group is L4.

In some aspects, a method implemented on a physics (including multiphysics) modeling and/or simulation computing system is contemplated. The system may include one or more modeling and/or simulation system processing units, one or more user input devices, optionally a display device, and one or more memory devices. The one or more processing units are adapted, during use, for implementing acts comprising: (i) selecting a geometry shape function space, for defining a geometry shape function space, common to at least two finite elements, each of the at least two finite elements including a dependent variable shape function space representing at least two dependent variables, wherein (ii) accuracy criteria is used by the system to select the geometry shape function space, shape function spaces of serendipity type of second order or higher and/or of Lagrange type of second order or higher are available for selection as a geometry shape function space for the system, and the selection of geometry shape function space is based on whether the geometry shape function space is a subset of a combination of the at least two dependent variable shape function spaces or whether it is not.

In some aspects, dependent variable shape function spaces are user selectable through a GUI, using an electronic device that allows for a selection or input signal to be generated. For example, a user may select the one or more dependent variable shape function spaces prior to the modeling and/or simulation system selecting a geometry shape function space.

In some aspects, the selection of a common geometry shape function space is based on a setting/criteria relating to super-parametric finite elements (e.g., such as a setting stating if calculations using super-parametric finite elements to represent the dependent variable is acceptable).

It is further contemplated that in some aspect a combination is an intersection of the at least two dependent variable shape function spaces (or indices related to the dependent variable shape function spaces) or a combination may be a union of the at least two dependent variable shape function spaces (or indices related to the dependent variable shape function spaces).

In some aspects, at least one dependent variable may be represented with a serendipity shape function space, or at least one dependent variable is represented with a serendipity shape function space and at least one other dependent variable is represented with a Lagrange shape function space.

It is also contemplated that at least one dependent variable may be represented with a hierarchical shape function space and at least one the geometry shape function may be represented with a hierarchical shape function space.

In some aspects, finite elements may be defined on quadrilateral, hexahedron, prism, or pyramid type mesh elements.

In some aspects, a method is executed on a modeling and/or simulation computing system including one or more processing devices, memory units, display devices, and selection and input tools, the method and/or system comprising: (i) one or more first lists including geometry shape function spaces, wherein the geometry shape function spaces are categorized according to accuracy criteria/rating, each geometry shape function space associated with one of one or more first sets of shape function indices; (ii) one or more physics or multiphysics interfaces, the physics or multiphysics interfaces including one or more dependent variables, the physics interfaces including a super-parametry setting for the one or more variables, the super-parametry setting stating if the one or more dependent variable accepts super-parametric finite elements or not.

In some aspects, the method may further include the steps of: (iii) the physics or multiphysics interface receiving user instructions defining one or more dependent variable shape function spaces on the mesh elements, each dependent variable shape function space being associated with one of one or more second sets of shape function indices; (iv) the computing system receiving from the physics or multiphysics interface the defined dependent variable shape function spaces, the associated one or more second sets of shape function indices, and super-parametry settings; (v) creating mesh element groups so that in each mesh element group, all mesh elements are of one mesh element geometry type, and all mesh elements include one or zero dependent variable shape function space per dependent variable, the mesh group additionally including instructions if super-parametric finite elements are acceptable, the instructions being based on received super-parametry settings.

In some aspects, the method further includes the steps of that for each mesh element group: (vi) controlling if one or more shape functions do not accept super-parametric finite elements; (vii) if one or more dependent variables, for which one shape function space has been defined within the mesh element group, do not accept super-parametric finite elements, creating for the mesh element group, a third set of shape function indices which is an intersection between the shape function indices of all second sets of shape function indices, associated with dependent variable shape function spaces defined on the mesh element group, that do not accept super-parametric finite elements; (viii) if all dependent variables, for which one shape function space has been defined within the mesh element group, accept super-parametric finite elements, create a third set of shape function indices, which is the union of all second sets of shape function indices, associated with dependent variable shape function spaces defined on the mesh element group; (ix) using the list of geometry shape function spaces, select a geometry shape function space whose associated first set of shape function indices is a subset of said third set of shape function indices (based on some accuracy criteria; and/or (x) defining the selected geometry shape function space as the geometry shape function space for all mesh elements in the mesh element group.

In some aspects the method is repeated until a geometry shape function space has been defined for all mesh elements. Then, in some aspects, using the one or more processing units, the step of satisfying continuity requirements across mesh group boundaries for adjacent mesh groups is implemented for node based geometry space function spaces by removing degrees of freedom/nodes and introducing transitional shape function spaces, or for hierarchical shape function spaces, by removing surplus higher order basis functions (monomials).

In certain aspects, it is contemplated that simulation systems for implementing the acts described in the present disclosure, such as acts for determining finite elements using a common geometry shape function space, include one or more simulation processing units, one or more memory devices, one or more input devices (e.g., graphical user interfaces, touchscreens, other input systems), and one or more display or output devices. In some aspects, simulation and/or modeling computing systems are contemplated, such as the systems described in US 2016/0077810, published on Mar. 17, 2016, and U.S. patent application Ser. No. 15/282,469, filed Sep. 30, 2016, entitled, "Systems and Methods for Reducing Application Startup Time for Physics Modeling Applications", which are commonly assigned to the applicant of the present disclosure, COMSOL AB of Stockholm, Sweden, and the disclosures of which are hereby incorporated by reference herein in their entireties.

Each of the aspects described above and obvious variations thereof are contemplated as falling within the spirit and scope of the claimed invention, which is set forth in the following claims.

In the claims, any reference signs placed between parentheses shall not be constructed as limiting the claim. The word "comprising" does not exclude the presence of elements or steps other than those listed in a claim. The word "a" or "an" preceding an element does not exclude the presence of a plurality of such elements.

The mere fact that certain measures are recited in mutually different dependent claims does not indicate that a combination of these measures cannot be used to advantage.

What is claimed is:

1. A method implemented on a physics simulation system for modeling physical systems, the physics simulation system including one or more simulation system processors, one or more electronic input devices, one or more electronic display devices, and one or more physical memory devices, the method comprising:
   displaying on at least one of the one or more electronic display devices a first geometric representation of a physical system being modeled on the physics simulation system, the first geometric representation being discretized into a plurality of mesh elements representing at least in part a discretized geometric representation of the geometry of the physical system;
   receiving, via at least one of the one or more electronic input devices, one or more user-selection inputs for the plurality of mesh elements, the one or more user-selection inputs indicating selections of dependent variable shape function spaces representing at least two dependent variables, wherein at least two of the selected dependent variable shape function spaces are different from each other;
   determining, via at least one of the one or more simulation system processors, one or more geometry shape function space options to select from for simulating the physical system, the one or more determined geometry shape function space options being common to the plurality of mesh elements and including a serendipity shape function space of a second order or higher, the determining of the one or more geometry shape function space options including (i) a determined geometry shape function space option being a subset of a combination of the dependent variable shape function spaces representing at least two dependent variables and (ii) satisfying an accuracy criteria based on an accuracy ordering of the determined geometry shape function space option of (i), the determining of the one or more geometry shape function space options to select from being performed by the physics simulation system;
   selecting a geometry shape function space from the one or more determined geometry shape function space options, the type and order of the selected geometry shape function space depending on the selected dependent variable shape function space;
   creating, via at least one of the one or more simulation system processors, a finite element mesh for the physical system being modeled, wherein the finite element mesh is on the plurality of mesh elements, the selected geometry shape function space, and the selection of dependent variable shape function spaces;
   generating, via at least one of the simulation system processors, a solution to a finite element simulation of the physical system being modeled, the solution based on the created finite element mesh; and
   displaying, on one of the one or more electronic display devices, a geometric representation of the generated solution to the finite element simulation of the physical system being modeled.

2. The method of claim 1, wherein the one or more determined geometry shape function space options include both serendipity and Lagrange shape function spaces.

3. The method of claim 2, wherein a serendipity geometry shape function space is defined on the plurality of mesh elements, and wherein at least one dependent variable shape function space, representing at least one of the dependent variables, is a Lagrange shape function space of second order or higher defined on the plurality of mesh elements.

4. The method of claim 3, wherein at least one other dependent variable shape function space, representing another dependent variable, is a serendipity shape function space of second order or higher.

5. The method of claim 2, wherein the one or more user-selection inputs of dependent variable shape function spaces are received prior to the determining the one or more geometry shape functions options.

6. The method of claim 2, wherein finite elements of the finite element mesh created by the selected dependent variable shape function spaces and geometry shape function spaces are divided into mesh groups, wherein the finite elements within each mesh group have the same mesh element geometry type and the finite elements within each mesh group include the same dependent variables represented by the selected dependent variable shape function spaces.

7. The method of claim 3, wherein the combination of the at least two dependent variable shape function spaces representing at least two dependent variables is an intersection of the at least two dependent variable shape function spaces, and at least one of the two dependent variables is associated with a setting that finite elements representing the at least one of the two dependent variables are not super parametric.

8. The method of claim 3, wherein the combination of the at least two dependent variable shape function spaces representing at least two dependent variables is a union of the at least two dependent variable shape function spaces.

9. The method of claim 1, wherein at least one dependent variable and at least one geometry shape function is represented with a hierarchical shape function space.

10. The method of claim 1, wherein the created finite element mesh is defined on quadrilateral, hexahedron, prism, or pyramid type mesh elements.

11. The method of claim 6, further comprising determining that continuity requirements are maintained across mesh group boundaries.

12. The method of claim 1, wherein all dependent variables are pre-defined within the same multiphysics modeling and simulation interface.

13. The method of claim 1, wherein two or more physics interfaces are used in the modeling and finite element simulation of the physical system.

14. The method of claim 1, wherein the accuracy criteria is that the geometry shape function space is the highest accuracy geometry shape function space from the accuracy ordering of shape function spaces.

15. The method of claim 1, wherein at least some of the one or more geometry shape function space options are hierarchical geometry shape function spaces.

16. The method of claim 6, wherein continuity requirements are resolved between at least two mesh element groups.

17. The method of claim 6, wherein continuity requirements are resolved between at least two mesh element groups by introducing transitional function spaces.

18. The method of claim 1, wherein the first geometric representation is a computer-aided design geometry.

19. The method of claim 1, wherein the discretization of the first geometric representation occurs prior to the first geometric representation being used by the physics simulation system.

20. The method of claim 1, wherein the accuracy ordering of shape function spaces includes a pre-determined accuracy ordering of shape function spaces between shape function spaces whose accuracy order is indeterminate.

21. The method of claim 1, wherein selecting a geometry shape function space from the determined geometry shape function space options is performed automatically by the simulation system.

22. The method of claim 1, wherein an accuracy ordering exists between multiple orders of both Lagrange and Serendipity shape functions.

23. A physics simulation system for modeling physical systems, the physics simulation system configured to generate a finite element simulation of a physical system being modeled, the physics simulation system comprising:
   one or more electronic input devices;
   one or more physical memory devices; and
   one or more simulation system processors configured to:
      receive a geometric representation of a physical system being modeled on the physics simulation system, the geometric representation being discretized into a plurality of mesh elements representing at least in part a discretized geometric representation of the geometry of the physical system;
      receive input data representing one or more user-selection inputs for the plurality of mesh elements, the one or more user-selection inputs indicating selections of dependent variable shape function spaces representing at least two dependent variables;
      determine one or more geometry shape function space options to select from for simulating the physical system, the determined one or more geometry shape function space options being common to the plurality of mesh elements and including a serendipity shape function space of a second order or higher, the determining of the one or more geometry shape function space options including (i) a determined geometry shape function space option being a subset of a combination of the dependent variable shape function spaces representing at least two dependent variables and (ii) satisfying an accuracy criteria based on an accuracy ordering of shape function spaces;
      select a geometry shape function space from the one or more determined geometry shape function space options, the type and order of the selected geometry shape function space depending on the selected dependent variable shape function space;
      create a finite element mesh for the physical system being modeled, wherein the finite element mesh is based on the plurality of mesh elements, the selected geometry shape function space, and the selection of dependent variable shape function spaces;
      generate a solution to a finite element simulation of the physical system being modeled, the solution based on the created finite element mesh; and
      transmit output data for display of a geometric representation of the generated solution to the finite element simulation of the physical system being modeled.

24. A physics simulation system for modeling physical systems, the physics simulation system configured to generate a finite element simulation of a physical system being modeled, the physics simulation system comprising:
   one or more electronic input devices;
   one or more physical memory devices;
   one or more electronic display devices; and
   one or more simulation system processors configured to:
      display on at least one of the one or more electronic display devices a geometric representation of a physical system being modeled on the physics simulation system, the geometric representation being discretized into a plurality of mesh elements representing at least in part a discretized geometric representation of the geometry of the physical system;
      receive, via at least one of the one or more electronic input devices, one or more user-selection inputs for the plurality of mesh elements, the one or more user-selection inputs indicating selections of dependent variable shape function spaces representing at least two dependent variables;
      determine, via at least one of the one or more simulation system processors, one or more geometry shape function space options to select from for simulating the physical system, the determined one or more geometry shape function space options being common to the plurality of mesh elements and including a serendipity shape function space of a second order or higher, the determining of the one or more geometry shape function space options including (i) a determined geometry shape function space option being a subset of a combination of the dependent variable shape function spaces representing at least two dependent variables and (ii) satisfying an accuracy criteria based on an accuracy ordering of shape function spaces;
      select a geometry shape function space from the one or more determined geometry shape function space options, the type and order of the selected geometry shape function space depending on the selected dependent variable shape function space;

create, via at least one of the one or more simulation system processors, a finite element mesh for the physical system being modeled, wherein the finite element mesh is based on the plurality of mesh elements, the selected geometry shape function space, and the selection of dependent variable shape function spaces;

generate, via at least one of the simulation system processors, a solution to a finite element simulation of the physical system being modeled, the solution based on the created finite element mesh; and display, on one of the one or more electronic display devices, a geometric representation of the generated solution to the finite element simulation of the physical system being modeled.

\* \* \* \* \*